United States Patent [19]

Yanagawa et al.

[11] Patent Number: 5,673,245
[45] Date of Patent: Sep. 30, 1997

[54] ROTARY OPTICAL SYSTEM FOR GUIDING AND CONVERGING DIVIDED LIGHT BEAMS TO A TAPE RECORDING MEDIUM

[75] Inventors: Naoharu Yanagawa; Susumu Nomura; Fumihiko Sano, all of Tokorozawa, Japan

[73] Assignee: Pioneer Electronic Corporation, Japan

[21] Appl. No.: 579,351

[22] Filed: Dec. 27, 1995

[30] Foreign Application Priority Data

Dec. 27, 1994 [JP] Japan ................................. 6-326468

[51] Int. Cl.$^6$ .......................................... G11B 7/09
[52] U.S. Cl. .................. 369/112; 369/44.18; 369/44.22; 369/97; 369/44.37
[58] Field of Search ................... 369/112, 97, 44.37, 369/44.18, 44.19, 44.14, 44.17, 44.32, 44.22

[56] References Cited

U.S. PATENT DOCUMENTS

| | | | |
|---|---|---|---|
| 4,633,455 | 12/1986 | Hudson | 369/97 |
| 5,153,870 | 10/1992 | Lee et al. | 369/112 |
| 5,432,763 | 7/1995 | Campbell et al. | 369/112 |
| 5,465,241 | 11/1995 | Narahara | 369/97 |
| 5,471,456 | 11/1995 | Tokumaru et al. | 369/97 |
| 5,513,163 | 4/1996 | Kim | 369/97 |
| 5,548,114 | 8/1996 | Van Rosmalten et al. | 369/97 |

*Primary Examiner*—Georgia Y. Epps
*Assistant Examiner*—Kim-Kwok Chu
*Attorney, Agent, or Firm*—Nixon & Vanderhye

[57] ABSTRACT

An optical pickup device includes: a stationary optical system for emitting a light beam and for producing a tracking error signal; and a rotary optical system rotatable around a rotary axis. The rotary optical system includes: a dividing unit for dividing the light beam emitted from the stationary optical system into a main beam and sub-beams; an objective lens for converging the main beam and the sub-beams on a recording surface of an optical tape and for receiving the main beam and the sub-beams reflected by the recording surface; and a guiding unit for guiding the main beam and the sub-beams to the objective lens and for guiding the main beam and the sub-beams reflected by the recording surface to the stationary optical system. The dividing unit, the objective lens and the guiding unit are arranged so as to be integrally rotated along with the rotary optical system, and the dividing unit is arranged on an optical path of the light beam between the stationary optical system and the objective lens.

9 Claims, 15 Drawing Sheets

TAPE ADVANCE DIRECTION

STATIONARY OPTICAL SYSTEM | ROTARY OPTICAL SYSTEM

FIG. 12A
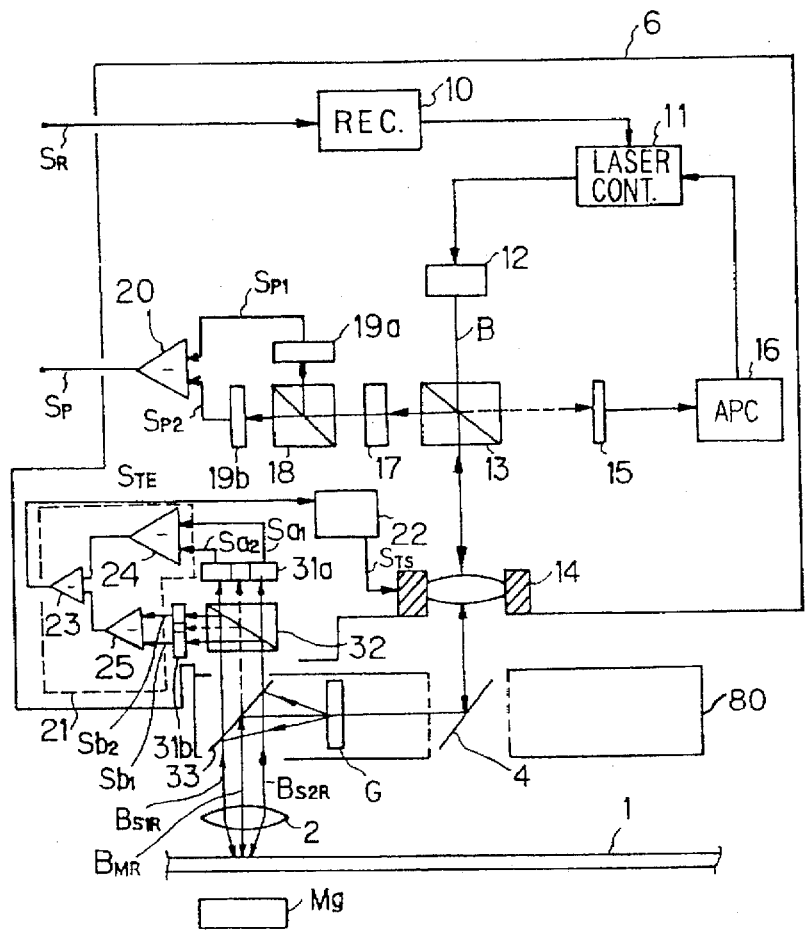
FIG. 12B
FIG. 12C
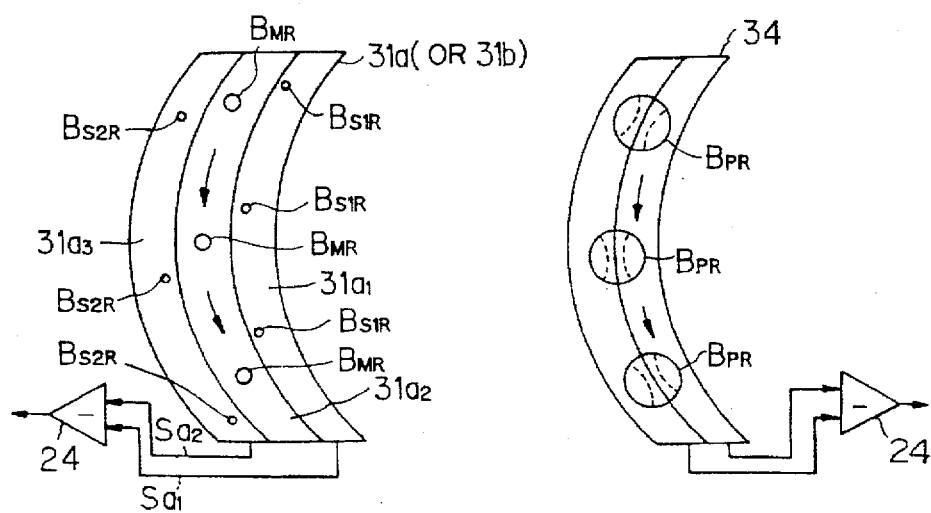

ROTARY OPTICAL SYSTEM FOR GUIDING AND CONVERGING DIVIDED LIGHT BEAMS TO A TAPE RECORDING MEDIUM

BACKGROUND OF THE INVENTION

1. Field of the Invention

The present invention relates to an optical pickup device, and more particularly to an optical pickup device for recording and reproducing information on and from a tape type optical recording medium.

2. Description of the Prior Art

There is broadly known an optical disc which is used for recording audio signal and/or video signal thereon and reproducing the recorded signal therefrom. The optical disc can achieve the high recording density, but has a limitation on the recording capacity due to its limited size of recording surface. On the other hand, a tape type recording medium such as a magnetic tape played by the VTR (Video Tape Recorder) has an ability to record information of approximately 100 times larger than the recording capacity of the optical disc, although the recording density is unsatisfactory in comparison with the optical disc. In this view, the combination of the high recording density of the optical disc and the large recording capacity of the tape type recording medium may provide a compact recording medium of large recording capacity. From this point of view, it has been developed a tape type recording medium with a base film on which magnetooptical layer such as TbFeCo is formed (hereinafter referred to as an "optical tape"), and recording and reproducing information on and from the optical tape by the irradiation of the laser light. Namely, information tracks are formed on the surface of the optical tape, and the laser light is irradiated on the tape along the information tracks, thereby recording and reproducing information.

Generally, in recording and reproduction of information with the light beam, the tracking control is required to move the light beam along the information track. As the tracking control technique, there is known a three-beams method, and it is convenient if the three-beams method is applicable to the recording/reproduction of information using the optical tape. The three-beams method needs a grating element which divides a light beam into a main beam for recording and reproducing the information and two sub-beams for obtaining a tracking error signal. Generally, the grating element is arranged at the position on the optical path of the light beam where the reflected light beam from the recording medium does not pass (normally, the position where the light beam from the light beam emission device immediately pass), so as not to divide the reflected light beam from the recording medium once again.

However, if the three-beams method is applied to the recording device of the optical tape, the following problem occurs. In the case of the optical tape, information tracks in a shape of circular arc are formed repetitively in the running direction of the tape, and the light beam is moved to trace the arc-shaped information tracks. Therefore, even if the main beam is moved to correctly trace the information tracks, the sub-beams for the tracking control does not necessarily move the appropriate positions because of the curves of the information tracks. The light emission unit for producing the light beam is rotated around the rotary axis so that the light beam traces the arc-shaped tracks. When the main beam is moved to trace the arc-shaped information track, the positional relationship between the sub-beams and the information track changes according to the rotative movement of the light emission unit. As a result, the tracking error signal is not correctly obtained. This problem may be overcome by rotating the light receiving unit for receiving the reflected light beams from the optical tape, however, such a treatment makes the pickup device complicated in its structure, large in size and expensive in cost. The above-described problem also takes place when the push-pull method is applied.

SUMMARY OF THE INVENTION

It is an object of the present invention to provide an optical pickup device capable of correctly performing the tracking control for the tape type optical recording medium.

According to one aspect of the present invention, there is provided an optical pickup device including: a stationary optical system for emitting a light beam and for producing a tracking error signal; and a rotary optical system rotatable around a rotary axis, the rotary optical system including: a dividing unit for dividing the light beam emitted from the stationary optical system into a main beam and sub-beams; an objective lens for converging the main beam and the sub-beams on a recording surface of an optical tape and for receiving the main beam and the sub-beams reflected by the recording surface; and a guiding unit for guiding the main beam and the sub-beams to the objective lens and for guiding the main beam and the sub-beams reflected by the recording surface to the stationary optical system, the dividing unit, the objective lens and the guiding unit being arranged so as to be integrally rotated along with the rotary optical system and the dividing unit being arranged on an optical path of the light beam between the stationary optical system and the objective lens.

In accordance with the present invention, the dividing unit is arranged on the optical path of the light beam between the stationary optical system and the objective lens and is rotated along with the rotary optical system. Therefore, the main beam and the sub-beams constantly maintain positional relations with the recording surface of the optical tape regardless of the rotation of the rotary optical system, thereby performing correct tracking control.

According to another aspect of the present invention, there is provided an optical pickup device including: a stationary optical system for emitting a light beam; and a rotary optical system rotatable around a rotary axis, the rotary optical system including: an objective lens for converging the light beam on a recording surface of an optical tape and for receiving the light beam reflected by the recording surface; a dividing unit for dividing the light beam reflected by the recording surface into a plurality of light beams; a guiding unit for guiding the light beam from the stationary optical system to the objective lens and for guiding the light beam reflected by the recording surface to the dividing unit; and a light receiving unit for receiving the light beams divided by the dividing unit to produce a tracking error signal, the objective lens, the dividing unit, the guiding unit and the light receiving unit being arranged so as to be integrally rotated along with the rotary optical system.

In accordance with the present invention, the light receiving unit for receiving the reflected light beam from the optical tape rotates along with the rotary optical system, and hence the tracking error signal may be correctly obtained using the push-pull method in the optical pickup for optical tape.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 12A is a block diagram illustrating the configuration of the optical pickup device according to the fourth embodiment;

FIGS. 12B and 12C are diagrams illustrating the shape of the light receiving element according to the fourth embodiment;

DETAILED DESCRIPTION OF THE PREFERRED EMBODIMENTS

The preferred embodiments of the present invention will be described with reference to the accompanying drawings. It is noted that in the following embodiments information is recorded on the optical tape according to the magnetooptical recording system.

1st Embodiment

Figure 1:
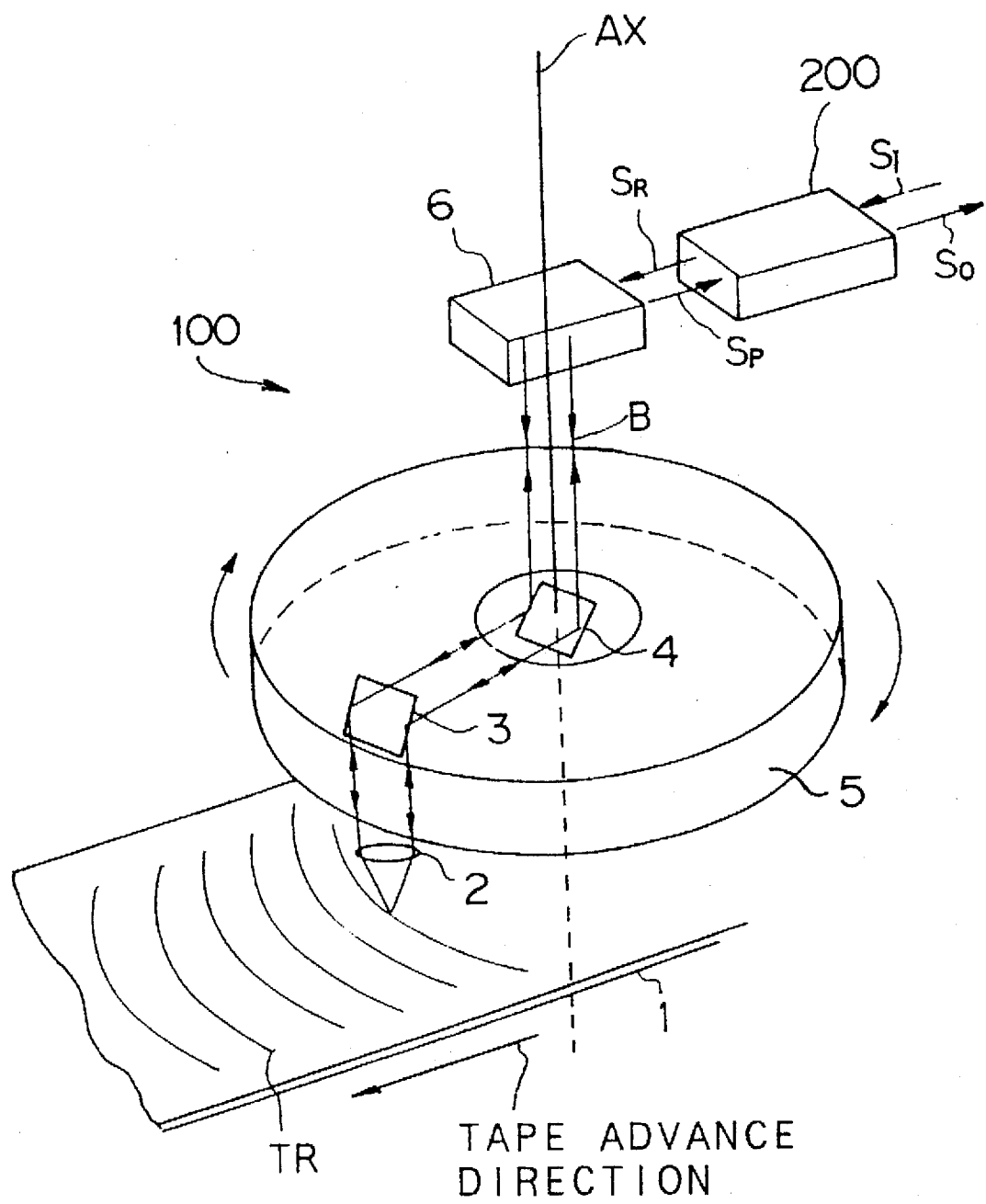
FIG. 1 is a diagram illustrating the concept of recording and reproduction according to the optical pickup device of this invention.
Figure 2:
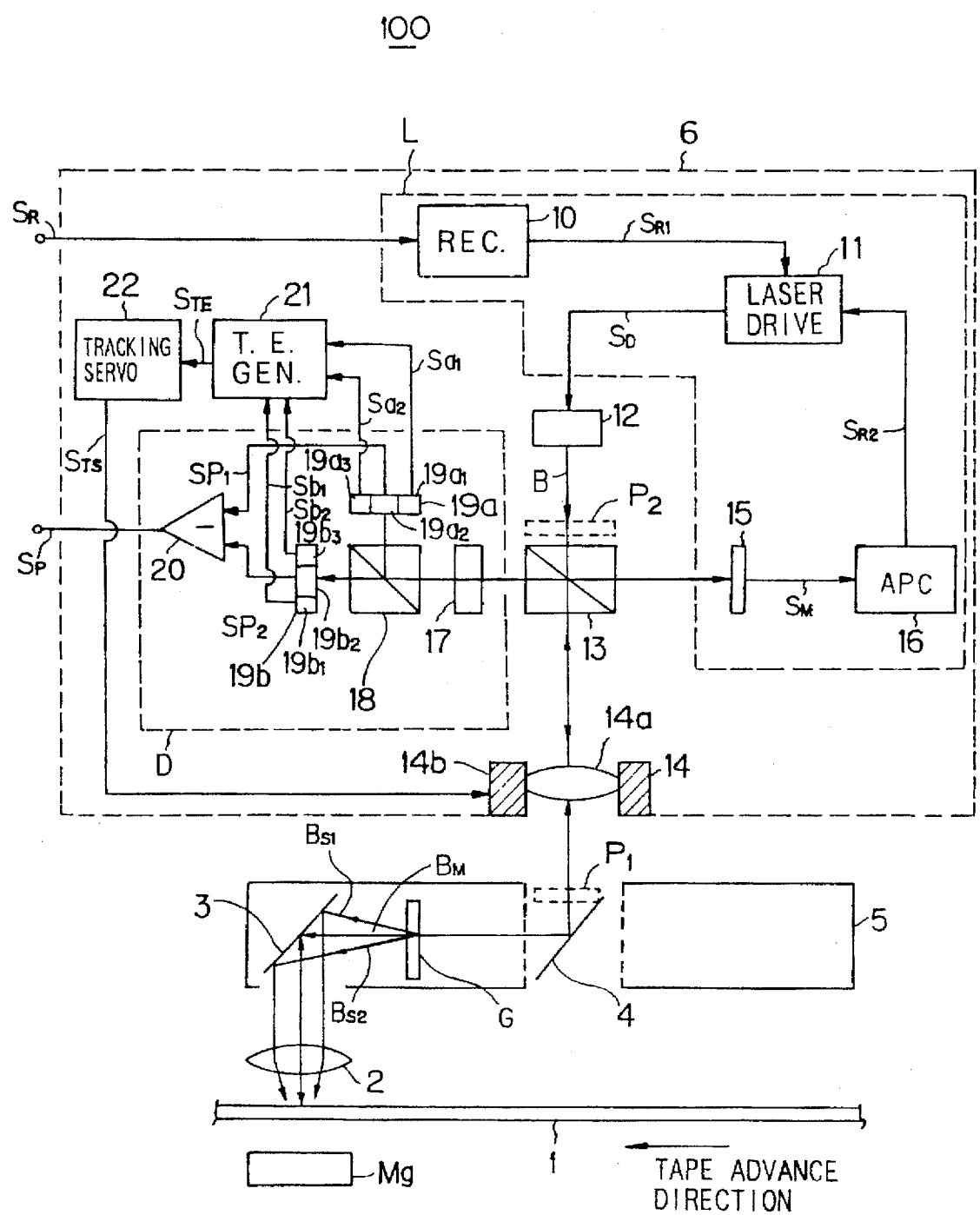
FIG. 2 is a block diagram illustrating the configuration of the optical pickup device according to the first embodiment.

The first embodiment of the present invention will be described with reference to FIGS. 1 to 6. FIG. 1 schematically illustrates the concept of recording and reproduction according to the optical pickup device of this invention, and FIG. 2 shows the configuration of the optical pickup device 100 according to the first embodiment. At the time of recording information, the signal processing unit 200 receives the input signal $S_I$, and outputs the recording signal $S_R$ to the optical pickup device 100. At the time of reproduction, the optical pickup device 100 produces the reproduction signal $S_P$ and supplies it to the signal processing unit 200. The signal processing unit 200 outputs the output signal $S_O$. The optical pickup device 100 of the first embodiment includes a stationary optical system 6, a rotary optical system 5 and a magnet Mg. The stationary optical system 6 receives the recording signal $S_R$ from the signal processing unit 200. The stationary optical system 6 includes the laser diode 12 for emitting the light beam B (recording light beam) for recording the information on the optical tape 1, and the light receiving elements 19a and 19b for receiving the light beam B (reproduction light beam) from the optical tape 1 and for producing the reproduction signal $S_P$. The rotary optical system 5 rotates around a rotary axis AX normal to the recording surface of the optical tape 1. The rotary optical system 5 converges the light beams B supplied from the stationary optical system 6 on the recording surface of the optical tape 1, and guides the reflected light beams B from the optical tape 1 to the stationary optical system 6. The magnet Mg applies the magnetic field onto the optical tape 1 at the time of recording and reproduction.

Next, each units of the optical pickup device 100 will be described in more detail. The stationary optical system 6 includes the laser control unit L, the laser diode 12, the beam-splitter 13, the actuator 14, the light receiving unit D, the tracking error signal generating unit 21, and the tracking servo unit 22. The laser control unit L outputs the laser driving signal $S_D$ for controlling emission of the light beam B, and the laser diode 12 emits the light beam B based on the laser driving signal $S_D$. The beam splitter 13 reflects and leads a part of the light beam B from the laser diode 12 to the monitor detector 15, and transmits and leads the rest of the light beam B to the actuator 14. In addition, the beam-splitter 13 reflects and guides the light beam B from the optical tape 1 to the light receiving unit D. The actuator 14 includes the lens 14a and the lens driver 14b for performing the tracking control and the focusing control of the light beam B. The light receiving unit D receives the light beam B from the beam-splitter 13 and produces the reproduction signal $S_P$. In addition, the light receiving unit D receives the reflected light beams of the sub-beams $B_{S1}$ and $B_{S2}$ (described later in detail), and outputs the error detection signals $S_{a1}$, $S_{a2}$, $S_{b1}$ and $S_{b2}$. The tracking error signal generating unit 21 generates the tracking error signal $S_{TE}$ based on the error detection signals $S_{a1}$, $S_{a2}$, $S_{b1}$ and $S_{b2}$. The tracking servo unit 22 generates the tracking servo signal $S_{TS}$ and supplies it to the actuator 14.

The rotary optical system 5 includes the reflecting mirrors 3 and 4, the grating G and the objective lens 2. The reflecting mirrors 3 and 4 guide the light beam B from the stationary optical system 6 to the objective lens 2 at the time of recording, and guide the light beam B reflected by the optical tape 1 to the stationary optical system 6 at the time of reproduction. The grating G divides the light beam B into the main beam $B_M$ for recording and reproducing information and the two sub-beams $B_{S1}$ and $B_{S2}$ for obtaining the tracking error signal. The objective lens 2 converges the light beam B on the recording surface of the optical tape 1.

The laser control unit L includes the recording circuit 10, the monitor detector 15, the APC (Automatic power Controller) 16 and the laser driving circuit 11. The recording circuit 10 conducts a necessary signal processing onto the recording signal $S_R$ to produce the recording control signal $S_{R1}$. The monitor detector 15 receives the light beam B reflected by the beam-splitter 13, and outputs the monitor signal $S_M$. The APC 16 outputs the monitor control signal $S_{R2}$ to control the power of the light beam B on the basis of the monitor signal $S_M$. The laser driving circuit 11 outputs the laser driving signal $S_D$ for driving the laser diode 12 based on the recording control signal $S_{R1}$ and the monitor control signal $S_{R2}$.

The light receiving unit D includes the cylindrical lens 17, the PBS (Polarization Beam Splitter) 18, the light receiving elements 19a and 19b, and the differential amplifier 20. The cylindrical lens 17 gives astigmatism to the light beam reflected by the optical tape 1 and further reflected by the beam-splitter 13, so as to obtain the focus error signal used for the focusing control of the light beam B. The PBS 18 only transmits the polarized light having a predetermined polarization state out of the reflected light to which the astigmatism is applied by the cylindrical lens 17, and reflects the light of other polarization state. The light receiving element 19a includes the light receiving portions $19_{a1}$, $19_{a2}$ and $19_{a3}$. The light receiving portion $19_{a2}$ receives the polarization light reflected by the PBS 18 and outputs the information detection signal $S_{P1}$. The light receiving portions $19_{a1}$ and $19_{a3}$ receive the reflected lights of the sub-beams $B_{S1}$ and $B_{S2}$ included in the reflected polarization light by PBS 18, and outputs the error detection signals $S_{a1}$ and $S_{a2}$, respectively. The light receiving element 19b includes the light receiving portions $19_{b1}$, $19_{b2}$ and $19_{b3}$. The light receiving portion $19_{b2}$ receives the polarization light transmitted through the PBS 18 and outputs the information detection signal $S_{P2}$. The light receiving portions $19_{b1}$ and $19_{b3}$ receive the reflected lights of the sub-beams $B_{S1}$ and $B_{S2}$ included in the reflected polarization light transmitted thorough the PBS 18, and outputs the error detection signals $S_{b1}$ and $S_{b2}$, respectively. The differential amplifier 20 receives the information detection signals $S_{P1}$ and $S_{P2}$, and calculates the difference thereof to output the reproduction signal $S_P$.

The optical path of the light beam is illustrated in FIG. 2. At the time of recording, the laser diode 12 emits the light beam B on the basis of the laser driving signal $S_D$ which corresponds to the recording signal $S_R$, and the grating G produces the main beam $B_M$ and the sub-beams $B_{S1}$ and $B_{S2}$. The beams are incident upon the recording surface of the optical tape 1, and the signal is recorded by the main beam $B_M$. The reflected light beams of the sub-beams $B_{S1}$ and $B_{S2}$ are guided to the light receiving unit D by the reflecting mirrors 3 and 4 and the beam-splitter 13, and the tracking servo signal $S_{TE}$ is produced based on these reflected light beams. At this time, the rotary optical system 5 is rotated around the rotary axis AX, which is normal to the surface of the optical tape 1, integrally with the reflecting mirrors 3 and 4, the grating G and the objective lens 2 by means of a driving mechanism (not shown). Thus, the information tracks TR of circular-arc shape are formed on the recording surface of the optical tape 1 (see. FIG. 1).

On the other hand, at the time of reproduction, the laser diode 12 emits the light beam B on the basis of the laser driving signal $S_D$, and the grating G produces the main beam $B_M$ and the sub-beams $B_{S1}$ and $B_{S2}$. These beams are irradiated on the recording surface of the optical tape 1, and the recorded signal is reproduced by the main beam $B_M$. The tracking servo signal $S_{TE}$ is produced based on the reflected light beams of the sub-beams $B_{S1}$ and $B_{S2}$, in the same manner as the case of recording. In addition, the rotary optical system 5 is rotated around the rotary axis AX during the reproduction of the recorded signal from the information track TR. It is noted that the function of the light beam and the magnet Mg in recording and reproduction of information will not be described in detail because the known magnetooptical recording/reproduction is carried out.

Figure 3:
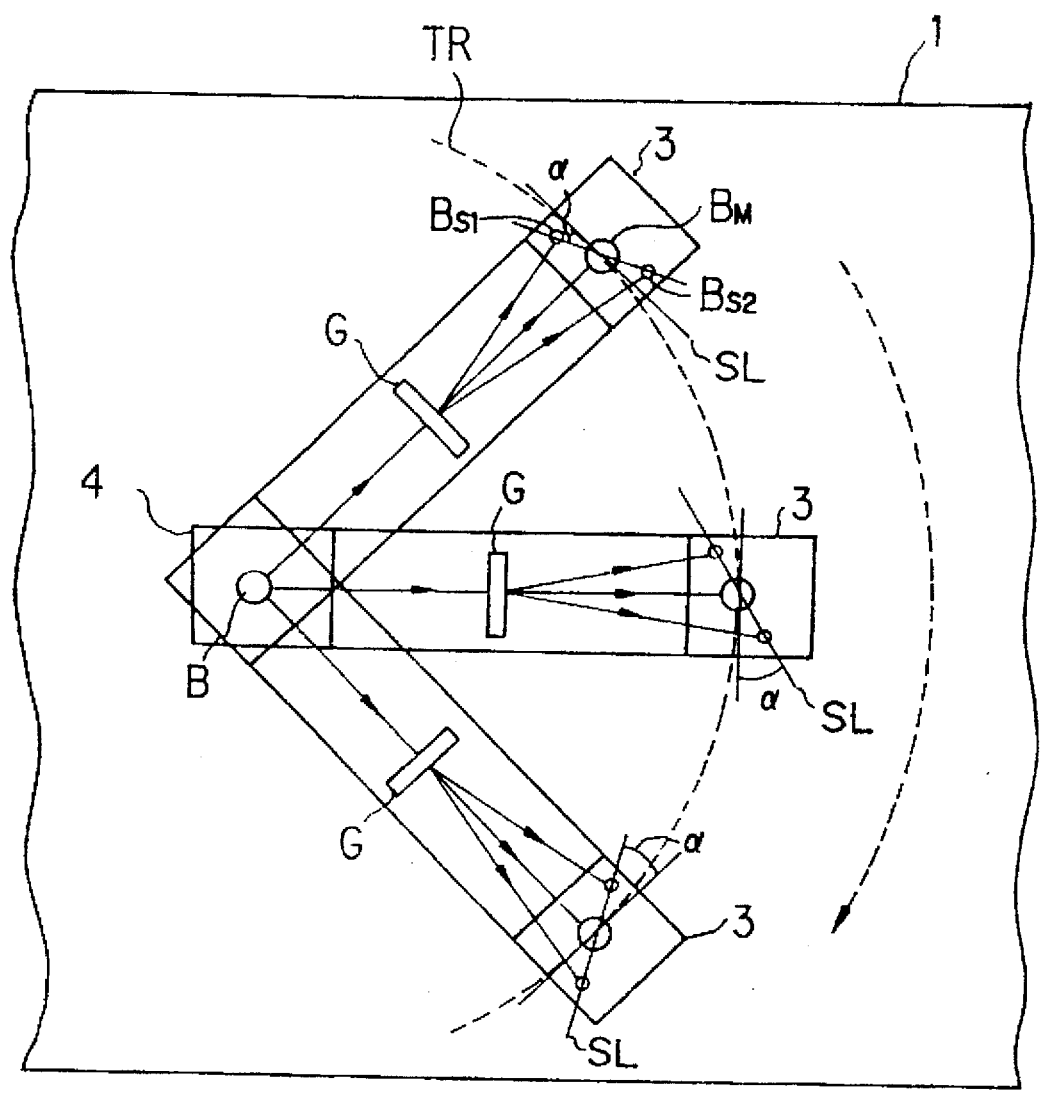
FIG. 3 is a plan view illustrating the irradiation positions of the light beams and the information track.

Next, the description will be given to the relationship between the positions of the main beam $B_M$ and the sub-beams $B_{S1}$ and $B_{S2}$ with respect to the information track TR, with reference to FIG. 3. As seen from FIG. 3, since the grating G for dividing the light beam B is positioned between the reflecting mirrors 3 and 4 in the rotary optical system 5, the irradiation positions of the beams $B_M$, $B_{S1}$ and $B_{S2}$ on the optical tape 1 maintain a constant positional relationship with the information track TR, regardless of the rotation of the rotary optical system 5. More specifically, the straight line SL connecting the positions of the beams $B_M$, $B_{S1}$ and $B_{S2}$ maintains a constant angle $\alpha$ with respect to the tangential line of the arc-shaped information track TR irrespective of the rotation of the rotary optical system 5, and hence the positions of the sub-beams $B_{S1}$ and $B_{S2}$ maintain constant distances from the information track TR, respectively, irrespective of the rotation of the rotary optical system 5. As a result, a correct tracking error signal can be obtained irrespective of the rotation of the rotary optical system 5, and the three-beams tracking control method can be applied to the optical pickup device for the tape type recording medium.

Figure 4A:
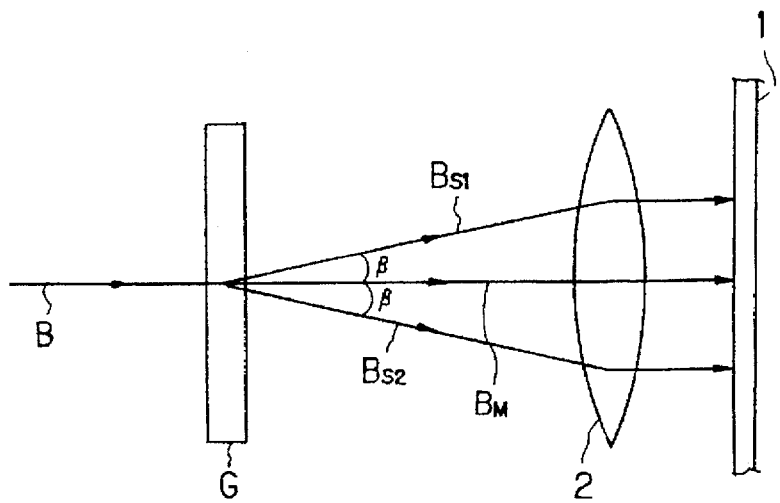
FIGS. 4A and 4B are diagrams illustrating the arrangement of the optical elements according to the first embodiment.
Figure 4B:
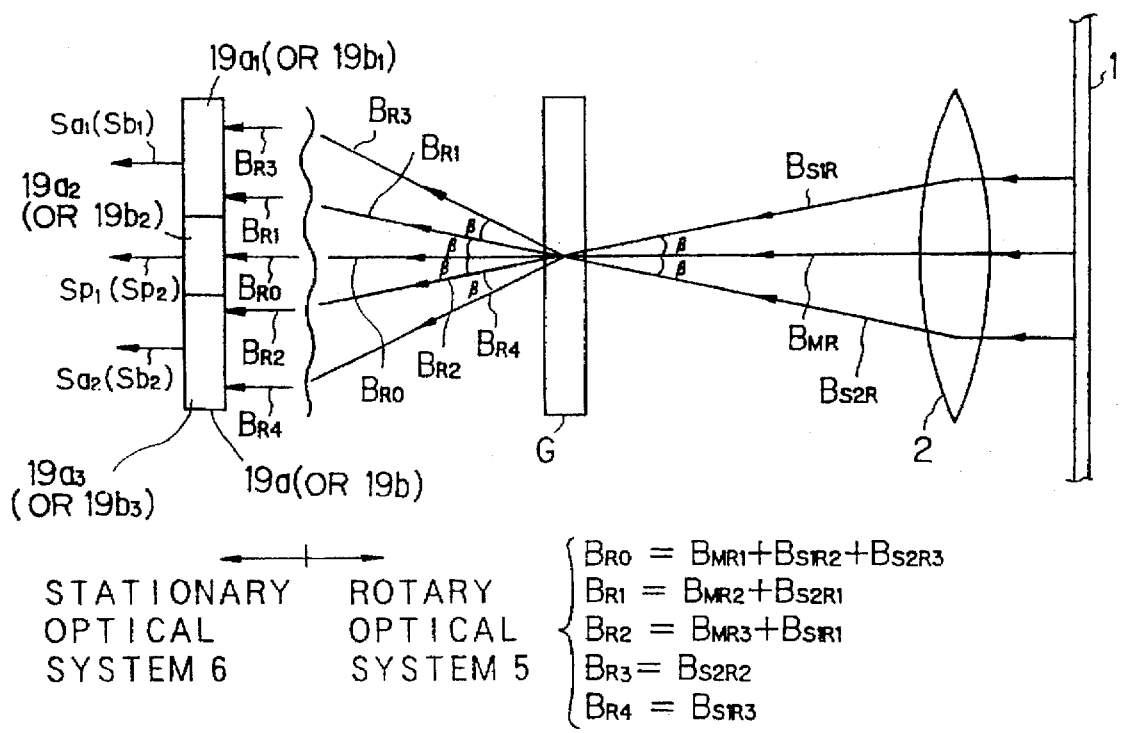

Next, the arrangement of the optical systems and the configuration of the light receiving unit D will be described with reference to FIGS. 4 to 6. First, the arrangement of the optical systems according to this embodiment will be described with reference to FIGS. 4A and 4B. It is noted that the following description is directed at the case of reproducing information. As shown in FIG. 4A, the light beam B entering the rotary optical system 5 is divided into the main beam $B_M$ and the two sub-beams $B_{S1}$ and $B_{S2}$ by the grating G, and the divided beams impinge upon the optical tape 1 after being converged by the objective lens 2. In the following description, the effect of the high-order diffracted lights produced by the grating G is neglected because their quantities are small. The light beam B reflected by the optical tape 1 is changed to the reflected main beam $B_{MR}$ modulated by the recorded information of the optical tape 1 and the reflected sub-beams $B_{S1R}$ and $B_{S2R}$, as shown in FIG. 4B. The reflected main beam $B_{MR}$ and the reflected sub-beams $B_{S1R}$ and $B_{S2R}$ again enter the grating G so that the respective beams are divided into three beams. Since the three beams are divided into three beams, respectively, nine beams are produced in theory. However, the grating G divides the light beam by the dividing angle $\beta$ in both directions (from the rotary optical system 5 side to the optical tape side 1, and from the optical tape 1 side to the rotary optical system 5 side), and consequently five beams are produced in total, as shown in FIG. 4B. More specifically, as shown in FIG. 4B, the reflected main beam $B_{MR}$ is divided into the reflected main beam portion $B_{MR1}$, the reflected main beam portion $B_{MR2}$ and the reflected main beam portion $B_{MR3}$. The reflected sub-beam $B_{S1R}$ is divided into the reflected sub-beam portion $B_{S1R1}$, the reflected sub-beam portion $B_{S1R2}$ and the reflected sub-beam portion $B_{S1R3}$. In addition, the reflected sub-beam $B_{S2R}$ is divided into the reflected sub-beam portion $B_{S2R1}$, the reflected sub-beam portion $B_{S2R2}$ and the reflected sub-beam portion $B_{S2R3}$. Therefore, the following relationship is obtained:

$$B_{R0}=B_{MR1}+B_{S1R2}+B_{S2R3},$$

$$B_{R1}=B_{MR2}+B_{S2R1},$$

$$B_{R2}=B_{MR3}+B_{S1R1},$$

$$B_{R3}=B_{S2R2},$$

and $$B_{R4}=B_{S1R3}.$$

Assuming that the grating G is controlled so that the reflected sub-beams $B_{S1R}$ and $B_{S2R}$ have antiphase with each other, the reflected sub-beam $B_{S1R2}$ is in antiphase with the reflected light sub-beam $B_{S2R3}$, the reflected sub-beams $B_{S2R1}$ is in antiphase with the reflected light sub-beam $B_{S1R1}$, and the reflected sub-beam $B_{S2R2}$ is in antiphase with the reflected light sub-beam $B_{S1R3}$. The divided reflected light beams $B_{R0}$ to $B_{R4}$ are received by the light receiving elements 19a and 19b after being reflected by the reflecting mirror 4 and then reflected or transmitted by the beamsplitter 13 (see. FIG. 2). Hereinafter, the description will be given only to the function of the light receiving element 19a, for the sake of brevity. As shown in FIG. 4B, the divided reflected light beam impinges upon the light receiving portion $19_{a2}$, and the information detection signal $S_{P1}$ is produced. Since the component of the reflected sub-beam portion $B_{S1R2}$ is in antiphase with the component of the reflected sub-beam portion $B_{S2R3}$, these components are cancelled out, and the information detection signal $S_{P1}$ only based on the reflected main beam portion $B_{MR1}$ modulated by the information on the optical tape 1 is obtained. The divided reflected light beams $B_{R1}$ and $B_{R3}$ impinge upon the light receiving portion $19_{a1}$, and the error detection signal $S_{a1}$ is produced on the basis of the sum of the divided reflected light beams $B_{R1}$ and $B_{R3}$. Similarly, the divided reflected light beam $B_{R2}$ and $B_{R4}$ impinge upon the light receiving portion $19_{a3}$, and the error detection signal $S_{a2}$ is produced on the basis of the sum of the divided reflected light beams $B_{R2}$ and $B_{R4}$. Thereafter, the tracking error signal generating unit 21 calculates the difference of the error detection signal $S_{a1}$ and the error detection signal $S_{a2}$. Since the reflected main beam portion $B_{MR2}$ and the reflected main beam portion $B_{MR3}$ are cancelled out by each other, and consequently the tracking error signal generating unit 21 performs the following operation:

$$S_{TE}=(B_{S2R1}+B_{S2R2})-(B_{S1R1}+B_{S1R3}),$$

and thereby the tracking error signal $S_{TE}$ is obtained based on the reflected sub-beams $B_{S1R}$ and $B_{S2R}$ which include tracking error components. The same operation is performed at the light receiving element 19b. Namely, the information detection signal $S_{P2}$ is produced only based on the reflected main beam portion $B_{MR1}$ modulated by the information on the optical tape 1, and the tracking error signal $S_{TE}$ is obtained based on the reflected sub-beams $B_{S1R}$ and $B_{S2R}$ according to the configuration of the tracking error signal generating unit 21.

Figure 5A:
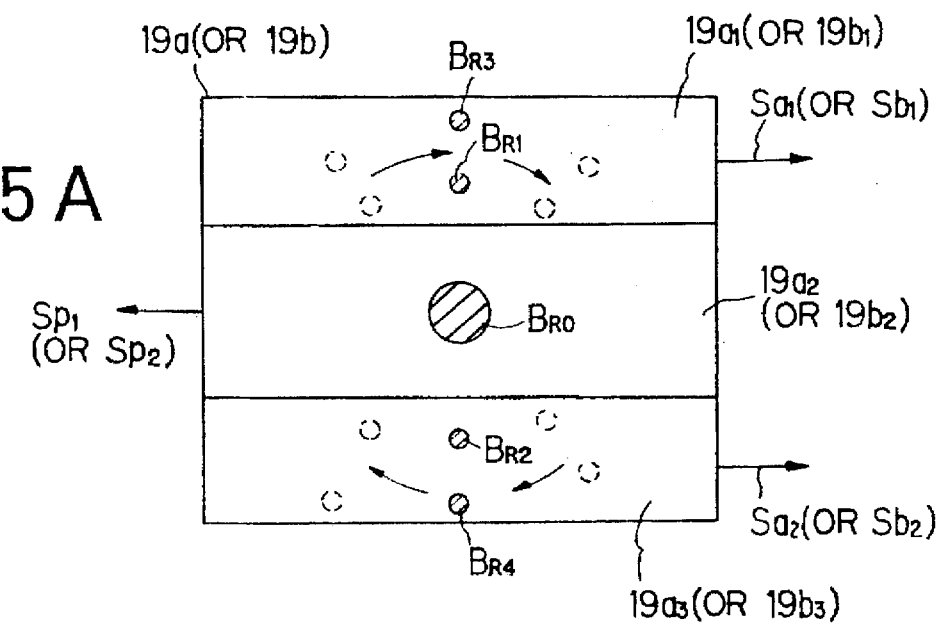
FIGS. 5A and 5B are diagrams illustrating the shape of the light receiving element according to the first embodiment.
Figure 5B:
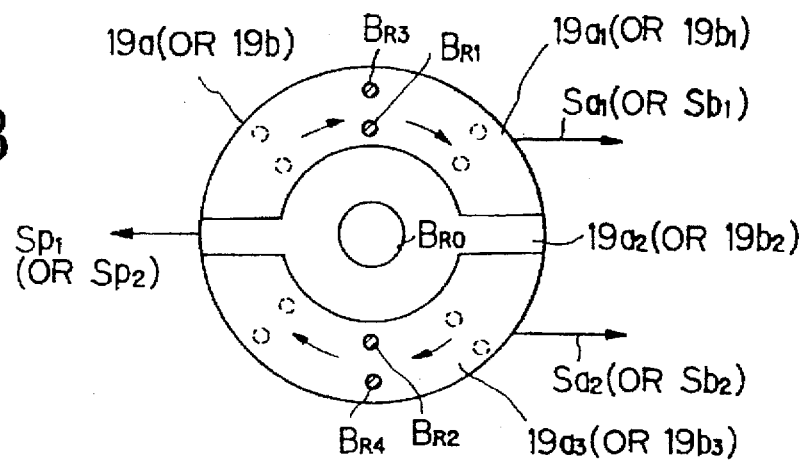

Next, the shapes of the light receiving elements 19a and 19b will be described with reference to FIGS. 5A and 5B. The following description is also directed only to the light receiving element 19a, for the sake of brevity. As shown in FIG. 5A, the light receiving element 19a includes the light receiving portion $19_{a2}$ for receiving the divided reflected light beam $B_{R0}$, the light receiving portion $19_{a1}$ for receiving the divided reflected light beams $B_{R1}$ and $B_{R3}$, and the light receiving portion $19_{a3}$ for receiving the divided reflected light beams $B_{R2}$ and $B_{R4}$. Each of the light receiving portions has a rectangular shape and is arranged at the appropriate positions to receive the divided reflected light beams. The relative positions of the divided reflected light beams $B_{R0}$ to $B_{R4}$ on the light receiving portions rotate around the position of the divided reflected light beam $B_{R0}$ in the clockwise direction indicated by the arrows in FIG. 5A according to the rotation of the rotary optical system 5. Since the light receiving portions $19_{a1}$ and $19_{a3}$ shown in FIG. 5A have sufficiently large size, respectively, the light receiving portions correctly receive the divided reflected light beams, and the information detection signal $S_{P1}$ and the error detection signals $S_{a1}$ and $S_{a2}$ are stably obtained even when the positions of the divided reflected light beams on the light receiving element rotate according to the rotation of the rotary optical system 5. Alternatively, the surface of the light receiving element 19a may be a circular shape as shown in FIG. 5B. In this case, since the light receiving portions $19_{a1}$ and $19_{a3}$ shown in FIG. 5B have sufficiently large sizes, respectively, the light receiving portions correctly receive the divided reflected light beams, and the information detection signal $S_{P1}$ and the error detection signals $S_{a1}$ and $S_{a2}$ are stably obtained. The shape of the light receiving element is not limited to the illustrated examples divided into three light receiving portions. Namely, the light receiving element 19a may have five light receiving portions. In this case, the divided reflected light beams $B_{R0}$ to $B_{R4}$ are received by the five portions, respectively, and the tracking error signal $S_{TE}$ may be produced using the signals from the five light receiving portions.

Figure 6A:
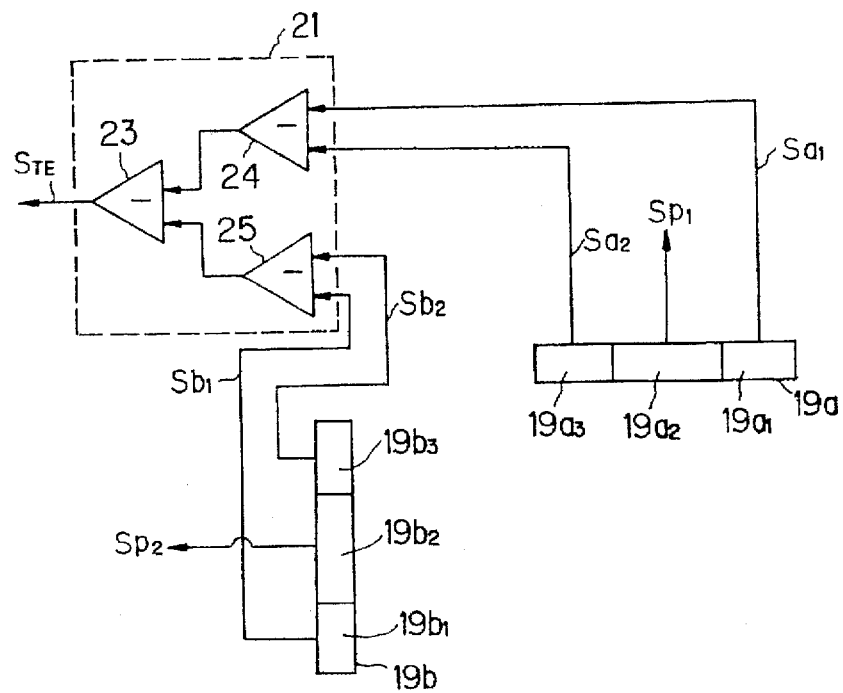
FIGS. 6A and 6B are diagrams illustrating the configuration of the tracking error signal generation unit according to the first embodiment.
Figure 6B:
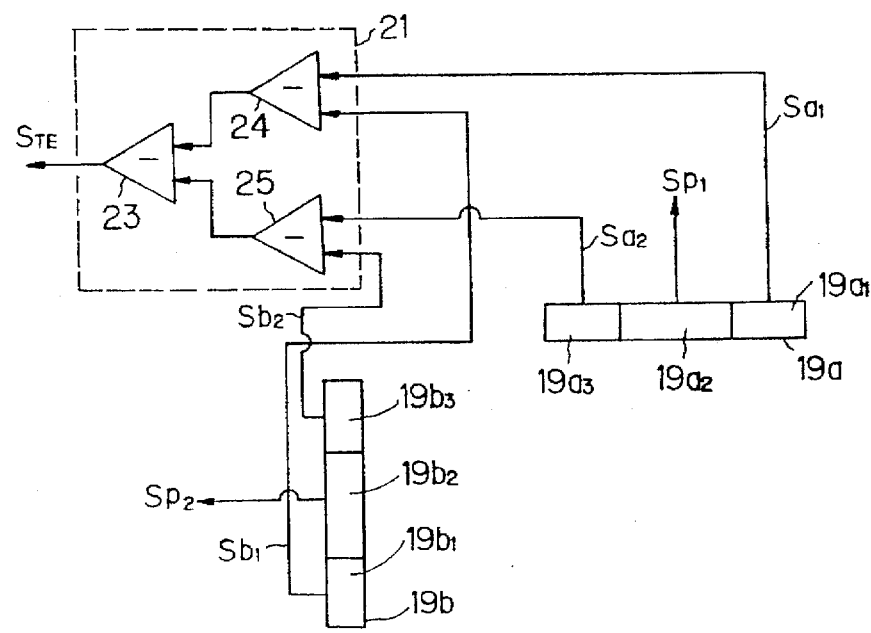

Next, the configuration of the tracking error signal generating unit 21 will be described with reference to FIGS. 6A and 6B. As shown in FIGS. 6A and 6B, the tracking error signal generating unit 21 includes three differential amplifiers 23 to 25, which calculate the difference of the input signals, respectively. In the configuration shown in FIG. 6A, the differential amplifier 24 outputs the difference of the tracking error signals $S_{a1}$ and $S_{a2}$, and the differential amplifier 25 outputs the difference of the error detection signals $S_{b1}$ and $S_{b2}$. The differential amplifier 23 calculates the difference of the output signals from the differential amplifiers 23 and 24, and outputs the result as the tracking error signal $S_{TE}$. On the other hand, in the configuration shown in FIG. 6B, the differential amplifier 24 outputs the difference of the error detection signals $S_{a1}$ and $S_{b1}$, and the differential amplifier 25 outputs the difference of the tracking error signals $S_{a2}$ and $S_{b2}$. The differential amplifier 23 calculates the difference of the output signals from the differential amplifiers 23 and 24, and outputs the result as the tracking error signal $S_{TE}$. Thus, the tracking error signal generating unit 21 generates the tracking error signal $S_{TE}$, and the tracking servo unit 22 generates the tracking servo signal $S_{TS}$ and supplies it to the actuator 14. The actuator 14 performs the servo control based on the tracking servo signal $S_{TS}$. Although the above description is directed only to the operation in recording information, the tracking control is performed in the same manner at the time of reproduction.

As described above, according to the first embodiment, the irradiation positions of the main beam $B_M$ and the sub-beams $B_{S1}$ and $B_{S2}$ maintain the constant positional relationship with the information track TR regardless of the rotation of the rotary optical system 5. Therefore, correct tracking error signal can be obtained, and the tracking servo control can be stabilized. Further, if the reflected light beam from the optical tape 1 is again divided by the grating G, all of the divided reflected light beams may be stably received by the light receiving unit. In the first embodiment, the grating G is arranged between the reflecting mirror 3 and 4 on the optical path of the light beam B. However, the grating may be arranged at the position on the optical path of the light beam B between the reflecting mirror 4 and the stationary optical system 6 (i.e., on the rotary axis AX), such as the position $P_1$ in FIG. 2, so that the grating 5 is rotated integrally with the rotary optical system 5. With this treatment, the irradiation positions of the main beam $B_M$ and the sub-beams $B_{S1}$ and $B_{S2}$ maintain the constant positional relationship with the information track TR regardless of the rotation of the rotary optical system 5, and hence correct tracking error signal can be obtained.

2nd Embodiment

Next, the second embodiment of the present invention will be described with reference to FIGS. 7 to 10. In the first embodiment, the grating G is disposed on the optical path of the light beam B in the rotary optical system 5. However, in the second embodiment, the polarization hologram element H is arranged on the optical path in the rotary optical system 5, in place of the grating G. Another difference between the first embodiment and the second embodiment is that the ¼-wave plate is disposed on the optical path of the light beam B at the position where the reflected light beam from the optical tape does not pass (normally, between the laser diode 12 and the beam-splitter 13). Other components are identical to those of the first embodiment, and therefore the detailed description will be omitted.

Figure 7:
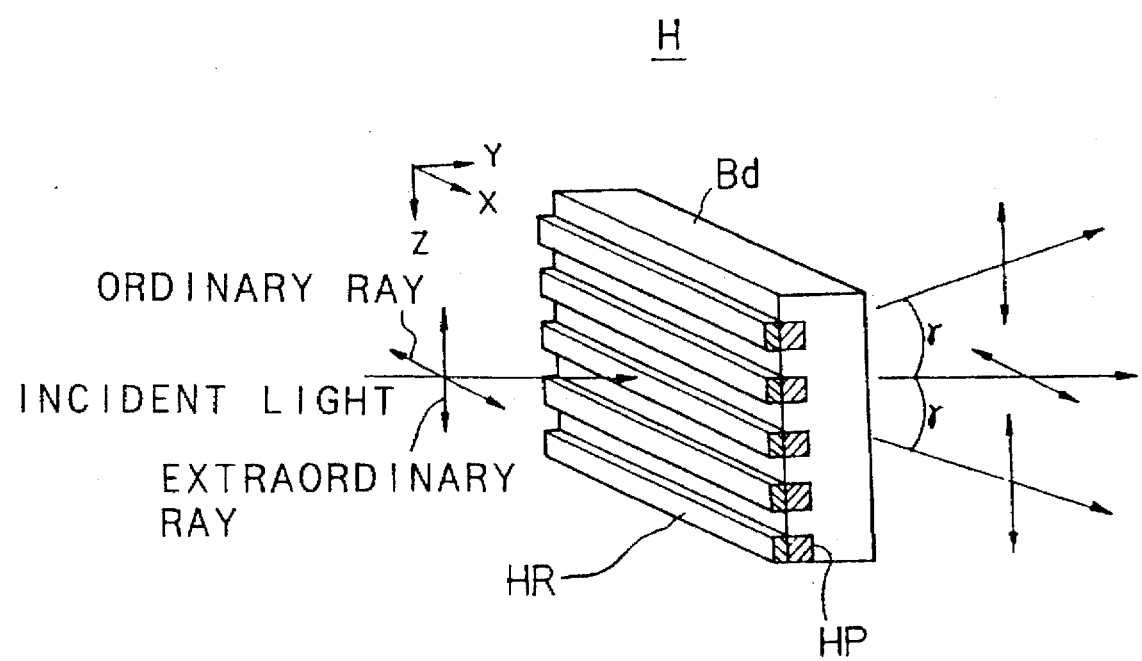
FIG. 7 is a diagram illustrating the configuration of the polarization hologram element according to the second embodiment.

FIG. 7 shows the appearance of the polarization hologram element. The hologram element H includes the substrate $B_d$ such as $LiNbO_3$ on which the proton exchange layer HP and the dielectric layer HR are formed. The polarization hologram element H transmits an incident ordinary ray as it is, but diffracts an incident extraordinary ray with a predetermined angle. As to the extraordinary ray, each diffracted lights has the identical diffracting angle ($\gamma$ in FIG. 7) with respect to the incident light axis. The ordinary ray is generally defined as a ray whose propagating velocity does not vary according to the propagating direction when the light incident on the crystal is divided by the double diffraction. The extraordinary ray is a ray whose propagating velocity varies according to the propagating direction when the light incident on the crystal is divided by the double diffraction. Both of the ordinary ray and the extraordinary ray include linearly polarized light, and their planes of the vibration are perpendicular to each other.

Figure 8A:
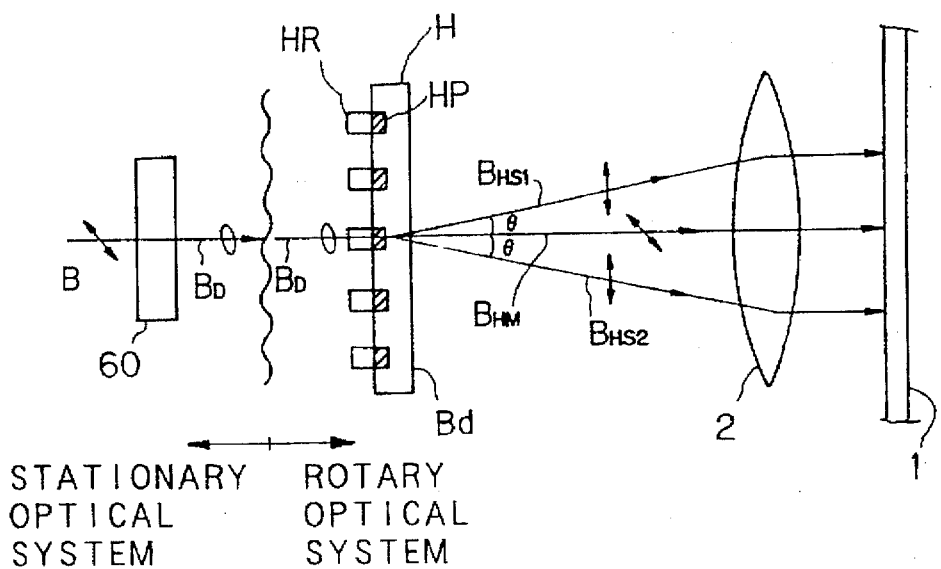
FIGS. 8A and 8B are diagrams illustrating the arrangement of the optical elements according to the second embodiment.
Figure 8B:
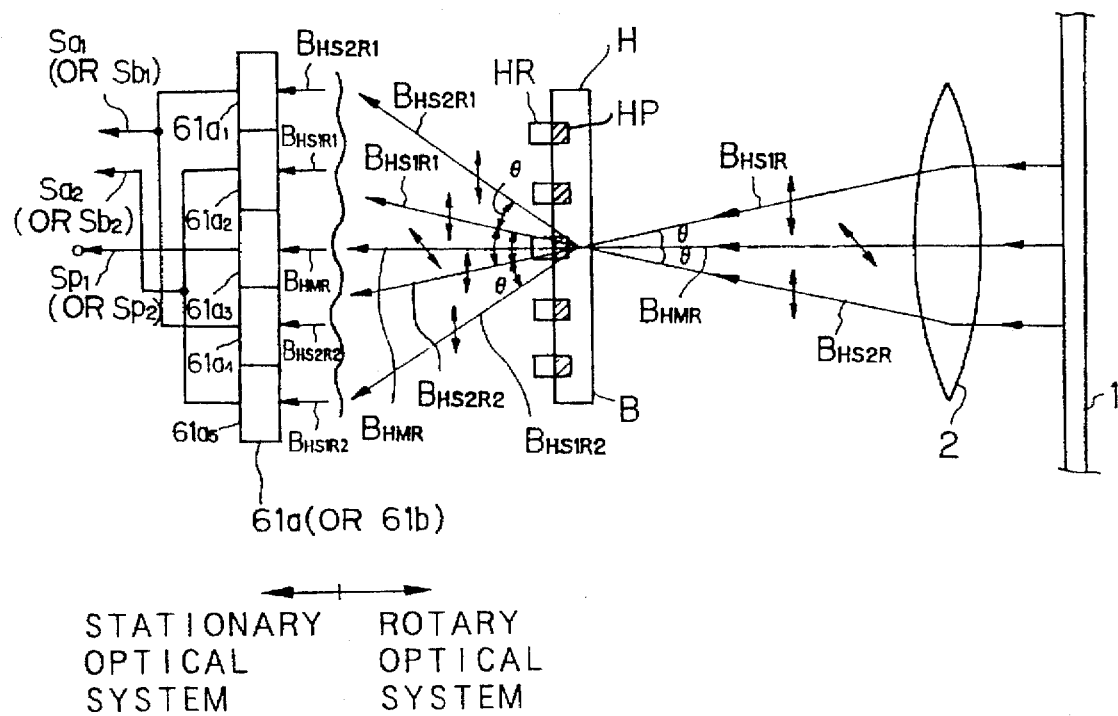

Next, the arrangement of the optical elements and their functions will be described with reference to FIGS. 8A and 8B. As seen in FIG. 8A, the light beam B, the ordinary ray, emitted by the laser diode 12 impinges upon the ¼-wave plate 60, and is converted to the elliptically-polarized light $B_D$ including the ordinary ray component for 90% and the extraordinary ray component for 10%. It is noted that the ordinary ray may be changed to the elliptically-polarized light by the ⅛-wave plate, instead of the ¼-wave plate. The elliptically-polarized light $B_D$ is guided to the polarization hologram element H by the beam-splitter 13, reflecting mirror 4, etc. At the polarization hologram element H, the ordinary ray component in the elliptically-polarized light $B_D$ is transmitted and becomes the main beam $B_{HM}$ for information recording/reproduction while and the extraordinary ray component is diffracted and becomes the sub-beams $B_{HS1}$ and $B_{HS2}$ for tracking control. Thereafter, the main beam $B_{HM}$ and the sub-beams $B_{HS1}$ and $B_{HS2}$ are converged by the objective lens 2 on the optical tape 1. At this time, since the polarization hologram element H rotates along with the rotary optical system 5, the positions of the main beam $B_{HM}$ and the sub-beams $B_{HS1}$ and $B_{HS2}$ maintain a constant positional relation with the information track TR, regardless of the rotation of the rotary optical system 5. Then, as shown in FIG. 8B, the main beam $B_{HM}$ and the sub-beams $B_{HS1}$ and $B_{HS2}$ is modulated by the information recorded on the optical tape 1, and become the reflected main beam $B_{HMR}$ and the reflected sub-beams $B_{HS1R}$ and $B_{HS2R}$ including the tracking error component. The reflected main beam $B_{HMR}$ and the reflected sub-beams $B_{HS1R}$ and $B_{HS2R}$ are incident upon the polarization hologram element H after passing through the objective lens 2. At this time, the reflected main beam $B_{HMR}$, which is an ordinary ray, is transmitted through the polarization hologram element H while the reflected sub-beams $B_{HS1R}$ and $B_{HS2R}$, which are extraordinary rays, are diffracted by the polarization hologram element H. As shown in FIG. 8B, when the incident angle of the reflected beams is expressed as $\theta$, the diffraction angle becomes $2\theta$. Therefore, the reflected sub-beam $B_{HS1R}$ is converted into the diffracted sub-beams $B_{HS1R1}$ and $B_{HS1R2}$, and the reflected sub-beam $B_{HS2R}$ is converted into the diffracted sub-beams $B_{HS2R1}$ and $B_{HS2R2}$. The reflected main beam $B_{HMR}$ and the diffracted sub-beams $B_{HS1R1}$, $B_{HS1R2}$, $B_{HS2R1}$ and $B_{HS2R2}$, passed through the polarization hologram element H, are guided to the light receiving unit D as the 5 rays by the reflecting mirror 3 and the beam-splitter 13, so as to be incident upon the light receiving elements 61a and 61b. It is noted that the light receiving elements 61a and 61b function as the light receiving elements 19a and 19b in the first embodiment.

The light receiving element 61a includes five light receiving portions $61_{a1}$ to $61_{a5}$, which receive the reflected main beam $B_{HMR}$ and the diffracted sub-beams $B_{HS1R1}$, $B_{HS1R2}$, $B_{HS2R1}$ and $B_{HS2R2}$. Then, the information detection signal $S_{P1}$ corresponding to the information recorded on the optical tape 1 is produced on the basis of the reflected main beam $B_{HMR}$. The diffracted sub-beams $B_{HS1R1}$, $B_{HS1R2}$, $B_{HS2R1}$ and $B_{HS2R2}$ impinge upon the light receiving elements $61_{a2}$, $61_{a5}$, $61_{a1}$ and $61_{a4}$, respectively, and the output signals corresponding to the respective diffracted sub-beams are obtained. Then, the error detection signal $S_{a1}$ is produced by adding the output signals from the light receiving elements $61_{a1}$ and $61_{a4}$ while the error detection signal $S_{a2}$ is produced by adding the output signals from the light receiving elements $61_{a2}$ and $61_{a5}$. In this way, the error detection signal $S_{a2}$ based on the reflected sub-beam $B_{HS2R}$ and the error detection signal $S_{a1}$ based on the reflected sub-beam $B_{HS2R}$ are obtained. Thereafter, the error detection signals $S_{a1}$ and $S_{a2}$ are supplied to the tracking error signal generating unit 21 which produces the tracking error signal $S_{TE}$. The light receiving element 61b performs the same operation as described above. Namely, the information detection signal $S_{P2}$ is produced, based on the reflected main beam $B_{HMR}$. In addition, the error detection signal $S_{b2}$ based on the reflected sub-beam $B_{HS1R}$ and the error detection signal $S_{b1}$ based on the reflected sub-beam $B_{HS2R}$ are obtained, and the tracking error signal generation unit 21 generates the tracking error signal $S_{TE}$. The functions of the other portions of the optical pickup device according to the second embodiment are the same as those of the first embodiment, and hence the detailed description will be omitted. As described above, according to the second embodiment, no light components reflected by the optical tape 1 is needed to be cancelled out, unlike the first embodiment. Therefore, the reflected light beam is effectively used to produce the tracking error signal. Of course, the second embodiment can achieve the same effect as that of the first embodiment.

The second embodiment car be modified in various manner as described below. It is noted that, in the following modifications, the polarization hologram element H is disposed on the optical path of the light beam B (on the rotary axis AX) between the reflecting mirror 4 and the stationary optical system 6.

Figure 9A:
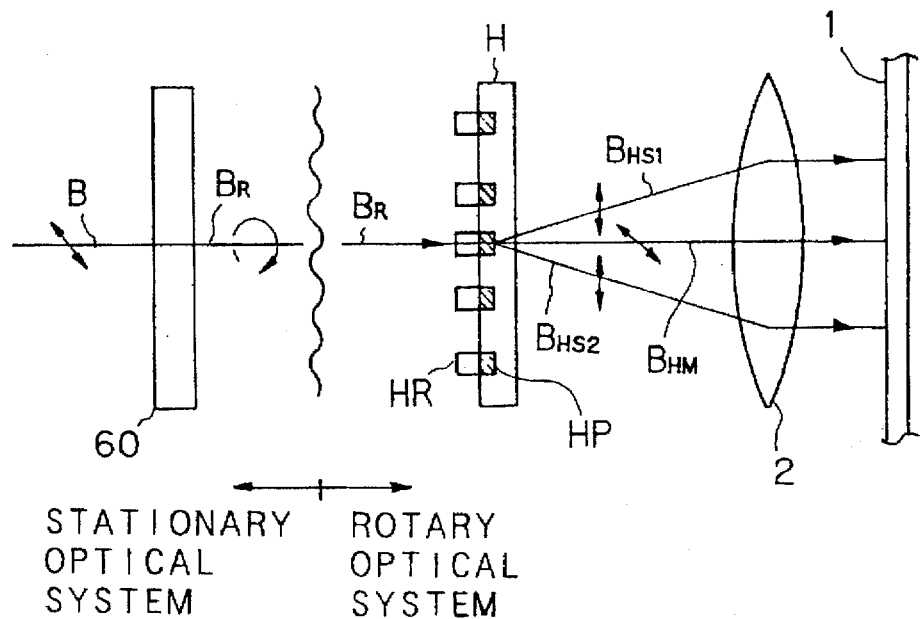
FIGS. 9A, 9B, 10A and 10B are diagrams illustrating the arrangement of the optical elements according to the modifications of the second embodiment.

FIG. 9A illustrates the first modification of the second embodiment. As shown, the ¼-wave plate 60 is arranged within the stationary optical system 6 so as to convert the light beam B, ordinary ray, into the light beam $B_R$ including circularly-polarized light. The light beam $B_R$ is incident upon the polarization hologram element H in the rotary optical system 5, and is divided into the main beam $B_{HM}$ including ordinary ray component and the sub-beams $B_{HS1}$ and $B_{HS2}$ including extraordinary ray component. Then, the main beam $B_{HMR}$ and the sub-beams $B_{HS1}$ and $B_{HS2}$ impinge upon the optical tape 1. Other configuration and function are the same as described above. According to the first modification, the light beam $B_R$ including circularly-polarized light is incident upon the polarization hologram element H, and hence the percentage of the ordinary ray and the extraordinary ray in the light beam $B_R$ becomes constant. Therefore, the ratio of the light quantities of the main beam $B_{HM}$ and the sub-beams $B_{HS1}$ and $B_{HS2}$, incident upon the optical tape 1, maintains constant value irrespective of the rotation of the rotary optical systems.

Figure 9B:
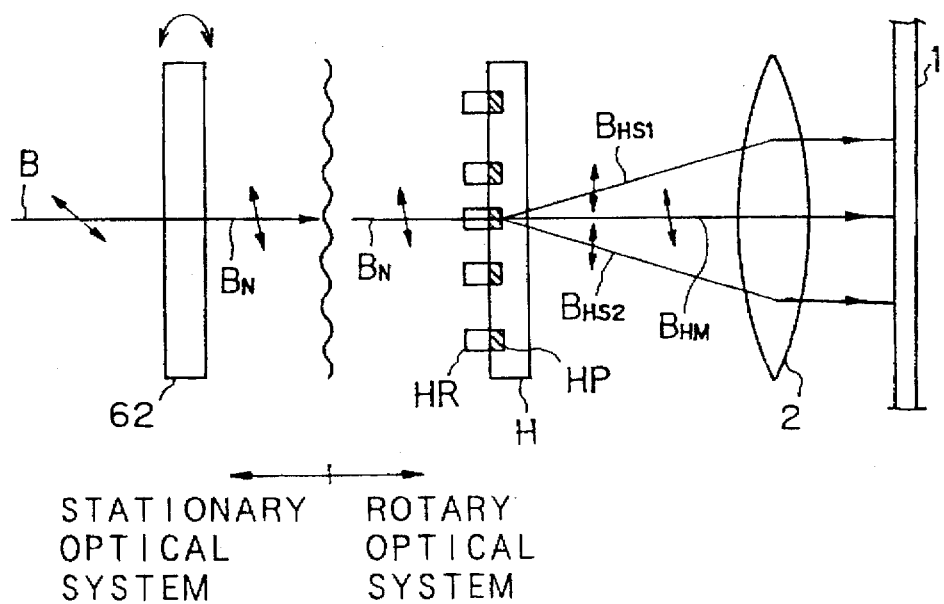

FIG. 9B illustrates the second modification of the second embodiment. As shown, the rotary optical system 6 is provided with the ½-wave plate 62 which is rotated in the same direction as the rotary optical system 5 at half rotational velocity of the rotary optical system 5. The light beam B is converted, by the ½-wave plate 62, into the light beam $B_N$ which includes the linearly-polarized light having the polarization surface inclined with respect to that of the light beam B. At this time, since the ½-wave plate 62 is rotating in the same direction at half rotational velocity of the rotary optical system 5, the polarization surface of the light beam $B_N$ maintains a constant positional relation with the polarization hologram element H, during the rotations. The ½-wave plate 62 is rotated at half velocity of the rotary optical system 5 because the polarization surface of the light beam $B_N$ rotates twice while the ½-wave plate 62 rotates once. Other components and the functions are the same as the second embodiment, and hence the detailed description will be omitted. According to the second modification, the light beam $B_N$ incident upon the polarization hologram element H includes the linearly-polarized light, and the polarization surface of the light beam $B_N$ has a constant positional relation with the polarization hologram element H. Therefore, the ratio of the light quantities of the main beam $B_{HM}$ and the sub-beams $B_{HS1}$ and $B_{HS2}$, incident upon the optical tape 1, maintains constant value irrespective of the rotation of the rotary optical system 5.

Figure 10A:
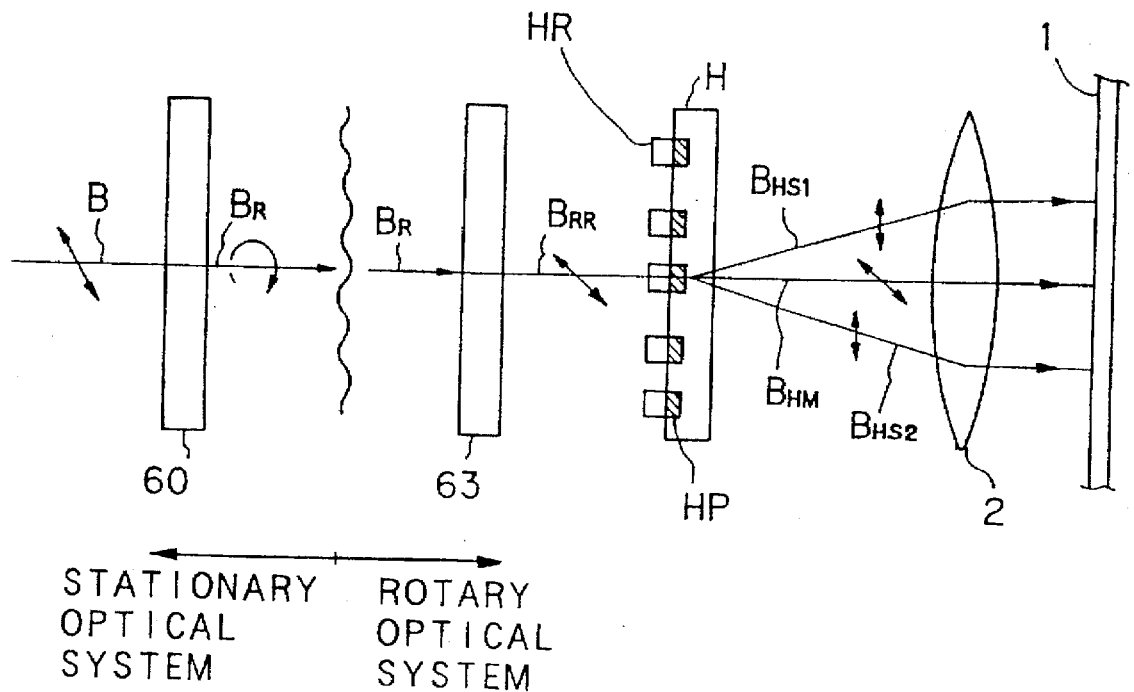

FIG. 10A illustrates the third modification of the second embodiment. As shown, the ¼-wave plate 60 is arranged within the stationary optical system 6 so as to convert the light beam B, ordinary ray, into the light beam $B_R$ including circularly-polarized light. Additionally, another ¼-wave plate 63 is disposed on the optical path of the light beam B (on the rotary axis AX) between the polarization hologram element H and the stationary optical system 6. The ¼-wave plate 63 rotates integrally with the rotary optical system 5 (polarization hologram element H). The light beam $B_R$, which is converted into the circularly-polarized light by the ¼-wave plate 60, is incident upon the ¼-wave plate 63 which converts the light beam $B_R$ into the linearly-polarized light $B_{RR}$. Since the polarization surface of the light beam $B_{RR}$ has a predetermined angle with respect to the polarization hologram element H, the light beam $B_{RR}$ is divided, by the polarization hologram element H into the main beam $B_{HM}$ including the ordinary ray component and sub-beams $B_{HS1}$ and $B_{HS2}$ including the extraordinary component. The main beam $B_{HM}$ and the sub-beams $B_{HS1}$ and $B_{HS2}$ impinge upon the optical tape 1. Other components and the functions are the same as the second embodiment, and hence the detailed description will be omitted. According to the third modification, since the light beam $B_R$ incident upon the ¼-wave plate 63 rotating is linearly-polarized light, the polarization surface of the light beam $B_{RR}$ rotates in synchronism with the rotation of the rotary optical system 5. Namely, the light beam $B_{RR}$ impinges upon the polarization hologram element H with its polarization surface having a predetermined angle with respect to the polarization hologram element H. Therefore, the ordinary ray component and the extraordinary ray component in the light beam $B_{RR}$ keep constant ratios to each other, and the ratio of the light quantities of the main beam $B_{HM}$, the sub-beams $B_{HS1}$ and $B_{HS2}$, incident upon the optical tape 1, maintains a constant value irrespective of the rotation of the rotary optical system 5. Further, since the predetermined angle of the polarization surface of the light beam $B_{RR}$ with respect to the polarization hologram element H may be altered arbitrarily, the ratio of the ordinary ray component to the extraordinary ray component in the light beam $B_{RR}$ may be arbitrarily altered. As a result, the ratio of the light quantities of the main beam $B_{HM}$ and the sub-beams $B_{HS1}$ and $B_{HS2}$ may be arbitrarily altered. It is noted that the ratio of the light quantities of the main beam $B_{HM}$ and the sub-beams $B_{HS1}$ and $B_{HS2}$ maintains the constant value regardless of the rotation of the rotary optical system 5, once it is determined.

Figure 10B:
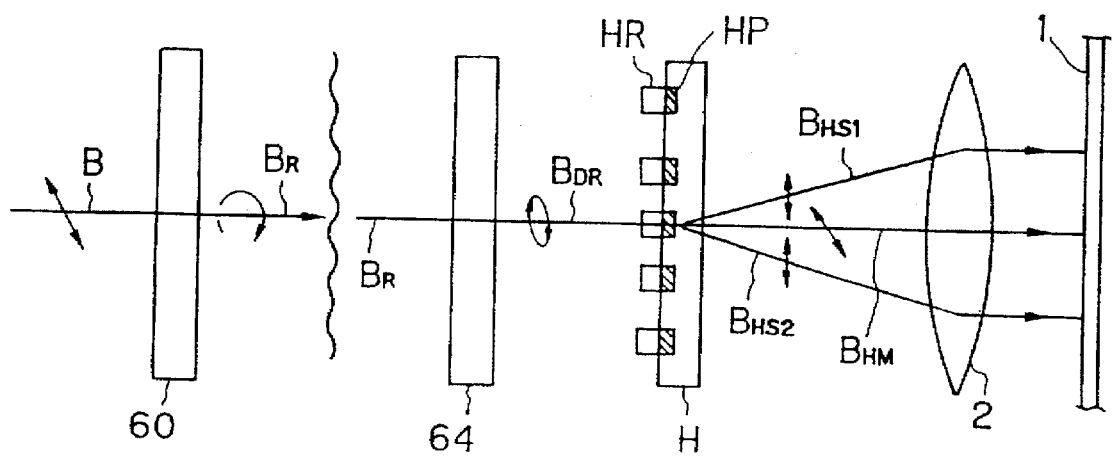

FIG. 10B illustrates the fourth modification of the second embodiment. As shown, in the fourth modification, the ¼-wave plate 63 in the third modification is replaced with the 1/n-wave plate 64 (e.g., n is an integer from 2 to 30). Namely, the 1/n-wave plate 64 is disposed on the optical path of the light beam B between the polarization hologram element H and the stationary optical system 6 and is rotated along with the rotary optical system 5 (i.e., along with the polarization hologram element H). Other components and the functions are the same as the second embodiment, and hence the detailed description will be omitted. The light beam $B_R$, which is converted into the circularly-polarized light by the ¼-wave plate 60, impinges upon the 1/n-wave plate 64 which converts the light beam $B_R$ into the light beam $B_{DR}$ having elliptically-polarized light prescribed by the number n. At this time, the light beam $B_R$ incident upon the 1/n-wave plate 64 is the circularly-polarized light, the axis of the elliptically-polarized light of the light beam $B_{DR}$ rotates in synchronism with the rotation of the rotary optical system 5. Namely, the light beam $B_{DR}$ impinges upon the polarization hologram element H with its elliptically-polarized light axis having a predetermined angle with respect to the polarization hologram element H. Therefore, the ordinary ray component and the extraordinary ray component in the light beam $B_{DR}$ keep a constant ratio, and the ratio of the light quantities of the main beam $B_{HM}$ and the sub-beams $B_{HS1}$ and $B_{HS2}$, incident upon the optical tape 1, maintains a constant value irrespective of the rotation of the rotary optical system 5. Further, since the ellipticity and the predetermined angle of the elliptically-polarized light axis with respect to the polarization hologram element H may be altered arbitrarily by varying the number n of the 1/n-wave plate 64, the ratio of the ordinary ray component and the extraordinary ray component in the light beam $B_{DR}$ may be altered. As a result, the ratio of the light quantities of the main beam $B_{HM}$ and the sub-beams $B_{HS1}$ and $B_{HS2}$ may be arbitrarily altered. It is noted that the ratio of the light quantities of the main beam $B_{HM}$ and the sub-beams $B_{HS1}$ and $B_{HS2}$ maintains the constant value regardless of the rotation of the rotary optical system 5, once it is determined.

3rd Embodiment

Figure 11A:
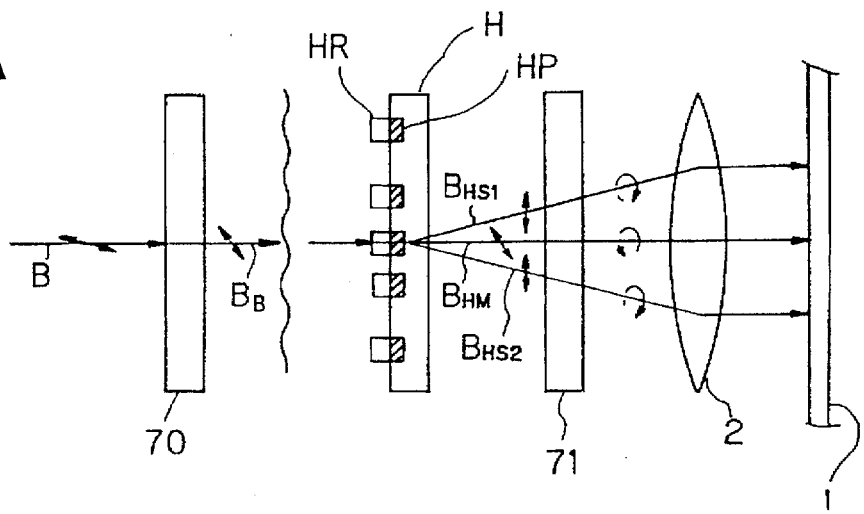
FIGS. 11A and 11B are diagram illustrating arrangement of the optical elements according to the third embodiment.
Figure 11B:
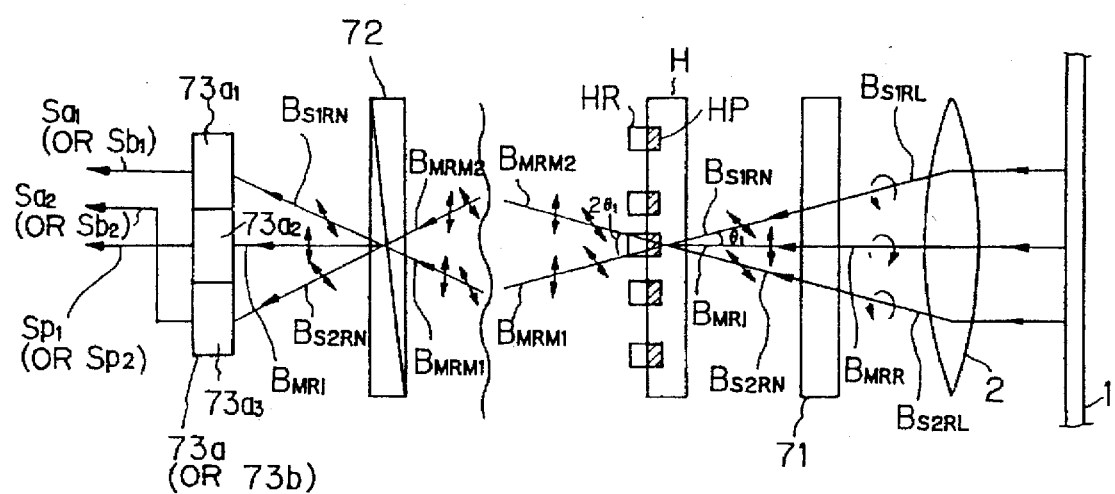

Next, the third embodiment of the present invention will be described with reference to FIGS. 11A and 11B. In the third embodiment, the ¼-wave plate 60 employed in the second embodiment is replaced with the ½-wave plate 70 on the optical path of the light beam B, and further the ¼-wave plate 71 is disposed in the rotary optical system 5 between the polarization hologram element H and the objective lens 2. Still further, the Wollaston prism 72 is provided in the stationary optical system 6 at the position in front of the light receiving unit D. Other components are identical to those of the first embodiment, and hence the detailed description will be omitted. The Wollaston prism is a kind of the polarization prisms, and functions to produce two linearly-polarized lights having vibration surface perpendicular to each other.

The arrangement of the components and their functions will be described with reference to FIGS. 11A and 11B. First, referring to FIG. 11A, the light beam B of ordinary ray emitted by the laser diode 12 impinges upon the ½ wavelength plate 70 which rotates the vibration surface of the light beam B by a predetermined angle, e.g., 45°, to produce the light beam $B_B$. At this time, the ½-wave plate 70 is disposed on the optical path between the laser diode 12 and the beam-splitter 13. According to the function of the ½-wave plate 70, the light beam $B_B$ includes the ordinary ray component and the extraordinary ray component. Then, the light beam $B_B$ is guided to the polarization hologram H by the beam-splitter 13 and the reflecting mirror 4. The ordinary ray component in the light beam $B_B$ is transmitted by the polarization hologram element H to be the main beam $B_{HM}$ for information recording while the extraordinary ray component is diffracted by the polarization hologram element H to be the sub-beams $B_{HS1}$ and $B_{HS2}$ for tracking control. Thereafter, the ¼-wave plate 71 converts the main beam $B_{HM}$ to the circularly-polarized light of counterclockwise direction and converts the sub-beams $B_{HS1}$ and $B_{HS2}$ to the circularly-polarized light of clockwise direction. These lights are converged by the objective lens 2 on the optical tape 1. Since the polarization hologram element H rotates according to the rotation of the rotary optical system 5, the irradiation positions of the main beam $B_{HM}$ and the sub-beams $B_{HS1}$ and $B_{HS2}$ maintain the constant positional relation with the information track TR, irrespective of the rotation of the rotary optical system 5. Then, as shown in FIG. 11B, the main beam $B_{HM}$ is modulated by the information recorded on the optical tape 1, and is converted to the reflected main beam $B_{MRR}$ of polarized light of clockwise direction. The sub-beams $B_{HS1}$ and $B_{HS2}$ are converted to the reflected sub-beams $B_{S1RL}$ and $B_{S2RL}$ which are polarized light in counterclockwise direction including tracking error component. The reflected main beam $B_{MRR}$ and the reflected sub-beams $B_{S1RL}$ and $B_{S2RL}$ impinge upon the ¼-wave plate 71 again via the objective lens 2. Thereby, the reflected main beam $B_{MRR}$ of clockwise polarization direction is converted to the reflected main beam $B_{MRI}$ of extraordinary ray while the reflected sub-beams $B_{S1RL}$ and $B_{S2RL}$ of counterclockwise polarization direction are converted to the reflected sub-beams $B_{S1RN}$ and $B_{S2RN}$ of ordinary ray. The polarization hologram element H transmits the reflected sub-beams $B_{S1RN}$ and $B_{S2RN}$ of ordinary ray and diffracts the reflected main beam $B_{MRI}$ of extraordinary ray. When the incident angle of the sub-beams $B_{S1RN}$ and $B_{S2RN}$ is expressed as $\theta_1$ as shown in FIG. 11B, the diffraction angle is $2\theta_1$, and hence the optical axis of the reflected main beam $B_{MRI}$ after the diffraction overlaps with the optical paths of the reflected sub-beams $B_{S1RN}$ and $B_{S2RN}$. Accordingly, the diffracted light $B_{MRM1}$ in FIG. 11B includes the reflected sub-beam $B_{S1RN}$ (ordinary ray) and the reflected main beam $B_{MRI}$ diffracted (extraordinary ray), and the diffracted light $B_{MRM2}$ includes the reflected sub-beam $B_{S2RN}$ (ordinary ray) and the reflected main beam $B_{MRI}$ diffracted (extraordinary ray). The diffracted lights $B_{MRM1}$ and $B_{MRM2}$ passed through the polarization hologram element H are guided to the light receiving unit D by the reflecting mirror 4 and the beam-splitter 13, after passing through the Wollaston prism 72. The Wollaston prism 72 has different refractive indexes for the ordinary ray and the extraordinary ray, and hence separates the diffracted lights $B_{MRM1}$ and $B_{MRM2}$ incident by equal angles into the ordinary ray and the extraordinary ray again. The reflected main beam $B_{MRI}$ (extraordinary ray) and the reflected sub-beams $B_{MRM1}$ and $B_{MRM2}$ (ordinary ray) impinge upon the light receiving elements 73a and 73b.

The light receiving element 73a includes three light receiving portions $73_{a1}$ to $73_{a3}$, which receive the reflected main beam $B_{MRI}$ and the reflected sub-beams $B_{S1RN}$ and $B_{S2RN}$, respectively. Then, the information detection signal $S_{P1}$ corresponding to the information recorded on the optical tape 1 is produced on the basis of the reflected main beam $B_{MRI}$ incident upon the light receiving portion $73_{a2}$. The reflected sub-beams $B_{S1RN}$ and $B_{S2RN}$ impinge upon the light receiving elements $73_{a1}$ and $73_{a3}$, respectively, and the output signals corresponding to the respective reflected sub-beams are obtained. Then, the output signal from the light receiving portion $73_{a1}$ is used as the error detection signal $S_{a1}$ while the output signal from the light receiving portion $73_{a3}$ is used as the error detection signal $S_{a2}$. In this way, the error detection signal $S_{a1}$ is obtained based on the reflected sub-beam $B_{S1RL}$ while the error detection signal $S_{a2}$ is obtained based on the reflected sub-beam $B_{S2RL}$. Thereafter, the error detection signals $S_{a1}$ and $S_{a2}$ are supplied to the tracking error signal generating unit 21 which produces the tracking error signal $S_{TE}$. The light receiving element 73b performs the same operation as described above. Namely, the information detection signal $S_{P2}$ is produced, based on the reflected main beam $B_{MRI}$. In addition, the error detection signal $S_{b1}$ based on the reflected sub-beam $B_{S1RL}$ and the error detection signal $S_{b2}$ based on the reflected sub-beam $B_{S2RL}$ are obtained, and the tracking error signal generation unit 21 generates the tracking error signal $S_{TE}$. The functions of the other portions of the optical pickup device according to the third embodiment is the same as those of the second embodiment, and hence the detailed description will be omitted.

As described above, according to the third embodiment, the circuit configuration may be simplified because it is necessary to divide the light receiving element into only three portions. Of course, the third embodiment can achieve the same effect as that of the second embodiment.

4th Embodiment

Next, the fourth embodiment of the present invention will be described with reference to FIGS. 12A to 12C. In the first to third embodiments described above, a single light receiving element produces both of the information detection signals ($S_{P1}$ and $S_{P2}$) and the error detection signals ($S_{a1}$, $S_{a2}$, $S_{b1}$ and $S_{b2}$). In this embodiment, different elements produce the information detection signals and error detection signals, separately from each other. Specifically, as shown in FIG. 12A, the stationary optical system 6 is provided with the light receiving elements 31a and 31b and the PBS 32 for producing the error detection signals $S_{a1}$, $S_{a2}$, $S_{b1}$ and $S_{b2}$ separately from the light receiving elements 19a and 19b for producing the information detection signals $S_{P1}$ and $S_{P2}$. In addition, the reflecting mirror 3 in the first embodiment is replaced with the half-mirror 33. In the above described configuration, the operation identical to that of the first embodiment is performed before the light beam B emitted from the laser diode 12 is incident upon the optical tape 1 via the rotary optical system 80, and therefore the description will not be repeated. According to the configuration shown in FIG. 12A, portions of the reflected main beam $B_{MR}$ and the reflected sub-beams $B_{S1R}$ and $B_{S2R}$ reach the PBS 32 after passing through the half-mirror 33. Then, the PBS 32 separates the light having a predetermined polarization surface, and supplies the light beams to the light receiving elements 31a and 31b. The shapes of the light receiving elements 31a and 31b will be described with reference to FIG. 12B. For the brevity's sake, the description will be only directed to the light receiving element 31a. As shown, the light receiving element 31a includes the light receiving portions $31_{a1}$, $31_{a2}$ and $31_{a3}$, each having the fan-shape. The shapes of the light receiving portions $31_{a1}$, $31_{a2}$ and $31_{a3}$ are designed so as to cover the movements of the reflected main beam $B_{MR}$ and the reflected sub-beams $B_{S1R}$ and $B_{S2R}$ according to the rotation of the rotary optical system 80 (see. arrows in FIG. 12B). Namely, the curvature of the respective light receiving portions $31_{a1}$, $31_{a2}$ and $31_{a3}$ are equal to the curvature of the information tracks TR of the optical tape 1. The light receiving element 31b has the same shape as the light receiving element 31a. On receiving the reflected main beam $B_{MR}$ and the reflected sub-beams $B_{S1R}$ and $B_{S2R}$, the light receiving element 31a outputs the error detection signals $S_{a1}$ and $S_{a2}$ based on the received beams. These error detection signals are supplied to the tracking error signal generating unit 21 which produces the tracking error signal $S_{TE}$. Other components of the fourth embodiment are identical to those of the first embodiment, and hence the detailed description will not be repeated. It is noted that the reflected main beam $B_{MR}$ is reflected by the half-mirror 33 and is supplied to the PBS 18 which produces the information detection signals $S_{P1}$ and $S_{P2}$. In the above description, the three-beams method is used. However, the push-pull method is applicable. In this case, the light receiving element 31a and 31b are designed as the two-divided light receiving element 34 shown in FIG. 12C, and the light receiving element 34 is disposed in place of the light receiving elements 31a and 31b. More specifically, the shape of the light receiving element 34 corresponds to the movement of the irradiation position of the reflected light beam $B_{PR}$ according to the rotation of the rotary optical system 80. The light receiving element 34 is positioned so that the center of the reflected light beam $B_{PR}$ traces the divisional line of the light receiving element 34. As described above, according to the fourth embodiment, the design of the optical system may be simplified, in addition to the effect achieved by the first embodiment.

5th Embodiment

Figure 13:
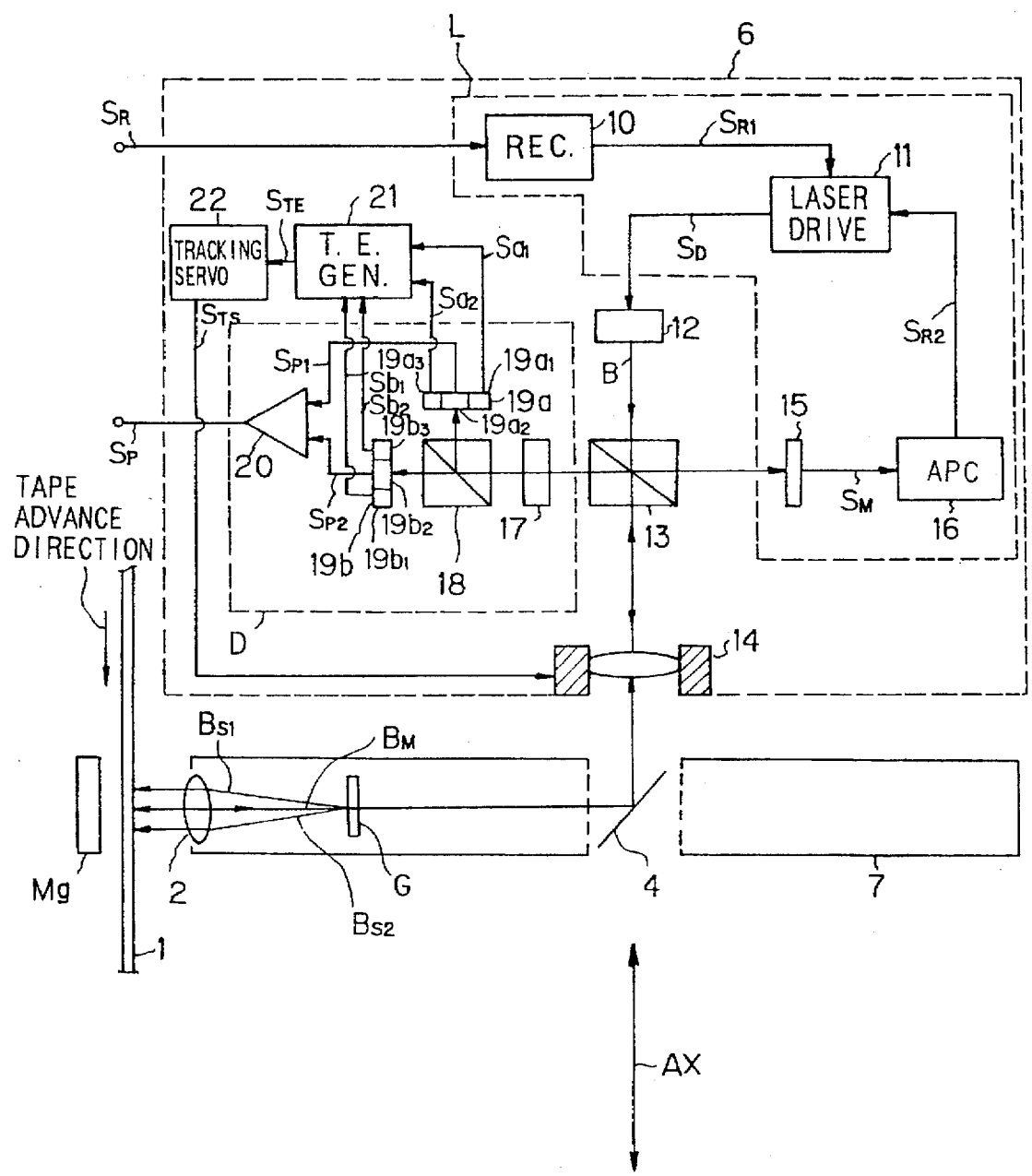
FIG. 13 is a block diagram illustrating the configuration of the optical pickup device according to the fifth embodiment.

Next, fifth embodiment of the present invention will be described with reference to FIG. 13. In the fifth embodiment, the rotary axis AX of the rotary optical system 5 is arranged so as not intersect the plane including the recording surface of the optical tape 1. More specifically, the rotary axis AX of the rotary optical system 7 is arranged in parallel with the advancing direction of the optical tape 1. As shown in FIG. 13, the optical tape 1 advances in downward direction in the figure. The main beam $B_M$ and the sub-beams $B_{S1}$ and $B_{S2}$ divided by the grating G are emitted from the rotary optical system 7 via the objective lens 2 to be incident upon the optical tape 1. Other components and their functions are the same as those of the first embodiment, and therefore the detailed description will be omitted. It is noted that the positional relation between the rotary axis AX of the rotary optical system 7 and the advancing direction of the optical tape 1 is not limited to the example shown in FIG. 13. Namely, the rotary axis AX may have a predetermined inclination with respect to the tape advancing direction. Alternatively, the advancing direction of the optical tape 1 may be normal to the sheet of FIG. 13 (perpendicular to the plane of the drawing sheet of FIG. 13). According to the fifth embodiment, the effect identical to the first embodiment may be achieved.

In the first to fifth embodiments, the grating G or the polarization hologram H is disposed in the rotary optical system 5. Preferably, the grating G or the polarization hologram H is so positioned that the optical path length of the light beam B between the grating G or the polarization hologram H to the optical tape 1 (i.e., grating G or the polarization hologram H→the optical tape 1→grating G or the polarization hologram H) becomes a certain optical path length by which the optical path length differences of the main beam and the respective sub-beams are not equal to λ/2 (λ: the wavelength of the light beam B). This is because, if the difference becomes equal to λ/2, the light quantity received by the light receiving element decreases due to the interference. Further, although the grating G or the polarization hologram element H is constituted independently of the objective lens 2, they may be constituted as a single part. Specifically, the grating element or the polarization hologram element may be formed on the objective lens 2 at the surface which is not opposite to the optical tape 1. Alternatively, the grating or the polarization hologram element may be adhered to the objective lens 2 to form a single part.

6th Embodiment

Figure 14:
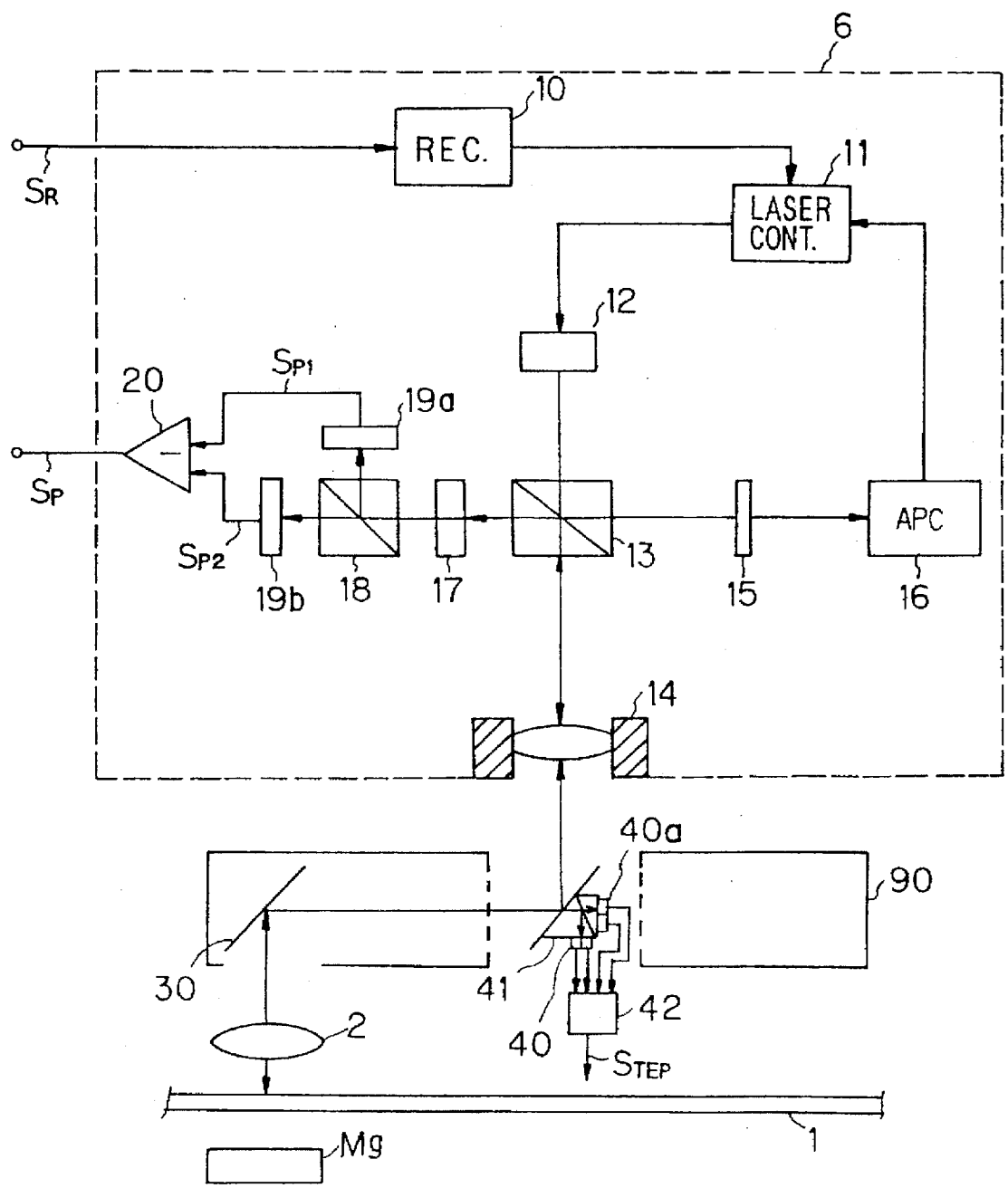
FIG. 14 is a block diagram illustrating the configuration of the optical pickup device according to the sixth embodiment.

Next, the sixth embodiment of the present invention will be described with reference to FIGS. 14 and 15. The sixth embodiment performs the tracking control according to the push-pull method in the optical pickup device for the optical tape. In this embodiment, as shown in FIG. 14, the PBS 41 and the two-divided detectors 40 and 40a are provided in the rotary optical system 90 in order to detect the tracking error components. The tracking error signal generation unit 42 calculates the difference of the output signals from the two-divided detectors 40 and 40a to produce the tracking error signal $S_{TE}$ according to the push-pull method. It is noted that the other components of the sixth embodiment are identical to those of the first embodiment, and hence the detailed description will be omitted. The preferred examples of the sixth embodiment will be described below.

(1) 1ST EXAMPLE

Figure 15A:
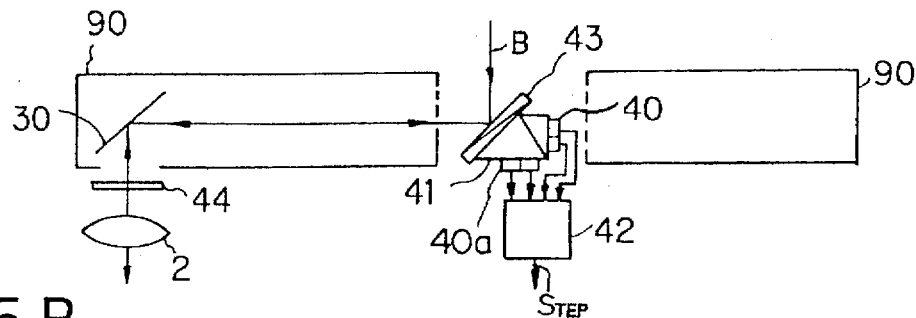
FIGS. 15A to 15D are diagrams illustrating the configuration of the rotary optical system according to the sixth embodiment.

FIG. 15A shows the first example of the sixth embodiment. As shown, the PBS 43 is provided at the front surface of the PBS 41, and the ¼-wave plate 44 is provided between the reflecting mirror 30 and the lens 2. The PBS 43 and the ¼-wave plate 44 are rotated along with the rotary optical system 90. When the light beam B having a predetermined polarization surface (e.g., S-polarization surface) impinges upon the PBS 43, the PBS 43 totally reflects it. The light beam B reflected by the reflecting mirror 30 passes through the ¼-wave plate 44 and is converged by the objective lens 2 on the optical tape 1. The reflected light beam B again passes through the ¼-wave plate 44 by which the S-polarization surface is converted to the P-polarization surface, and is guided to the PBS 43. The PBS 43 transmits the light beam having the P-polarization surface, and the transmitted light beam reaches the PBS 41. The PBS 41 separates the light beams having different polarization surfaces which are incident upon the two-divided detectors 40 and 40a. Then, the tracking error signal $S_{TEP}$ is produced based on the output signals from the respective detectors 40 and 40a.

(3) 2ND EXAMPLE

Figure 15B:
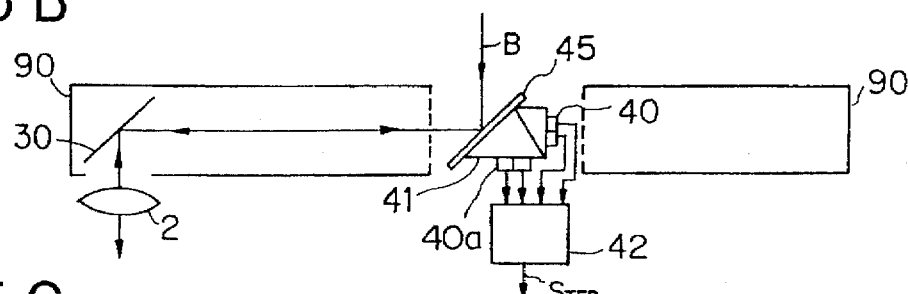

FIG. 15B shows the second example of the sixth embodiment. As shown, in this example, the half-mirror 45 is arranged at the front surface of the PBS 41. The half-mirror 45 is rotated along with the rotary optical system 90. When the light beam B impinges upon the half-mirror 45, a 50% of the light beam B is reflected to be incident upon the reflecting mirror 30, and is converged by the objective lens 2 on the optical tape 1. The reflected light beam is guided again to the half-mirror 45. A 50% of the reflected light beam impinges upon the PBS 41 by which it is separated into two beams. The separated beams are incident upon the two-divided detectors 40 and 40a, and the tracking error signal $S_{TEP}$ is produced based on the output signals of the two-divided detectors 40 and 40a. In this second example, a part of the light beam B outputted from the rotary optical system 6 passes through the half-mirror 5, and is incident upon the two-divided detectors 40 and 40a by the PBS 41. However, since the output signals of the two-divided detectors 40 and 40a corresponding to the part of the light beam are D.C. components, they are cancelled out by calculating the difference of the output signals of the detectors 40 and 40a. Alternatively, the component may be cancelled out by A.C. coupling the output signals of the detectors 40 and 40a to extract only the A.C. component.

(3) 3RD EXAMPLE

Figure 15C:
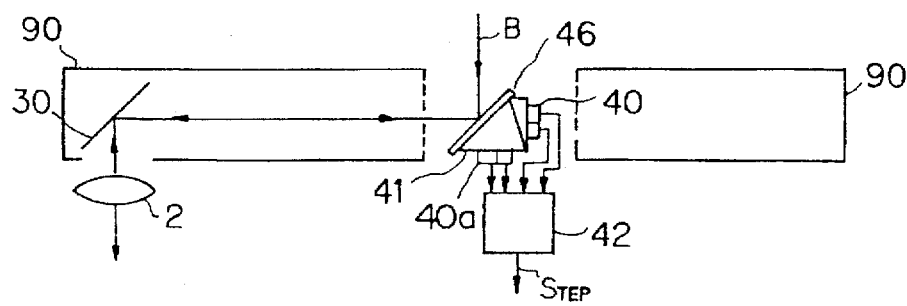

FIG. 15C shows the third example of the sixth embodiment. As shown, the R/T (Reflecting/Transparent) change mirror 46 is arranged at the front surface of the PBS 41. This part is rotated along with the rotary optical system 90. The R/T change mirror 46 has an ability to vary the ratio of the reflected light and the transmitted light (e.g., a 80% of the light beam is reflected and a 20% of the light beam is transmitted). When the R/T change mirror 46 is set to have the above reflecting/transmitting ratio, it reflects 80% of the light beam B. The reflected beam is further reflected by the reflecting mirror 30, and then converged on the optical tape 1 by the objective lens 2. The reflected light beam from the optical tape 1 is guided again to R/T change mirror 46. A 20% of the reflected light beam is separated by the PBS 41, and the separated beams are received by the two-divided detectors 40 and 40a. The tracking error signal generation unit 42 produces the tracking error signal $S_{TEP}$ based on the output signals of the detectors. In this third example, a part (20%) of the light beam B outputted from the rotary optical system 6 passes through the R/T change mirror 46, and is incident upon the two-divided detectors 40 and 40a via the PBS 41. However, this component may be cancelled out by calculating the difference of the output signals of the detectors 40 and 40a or by A.C. coupling the output signals of the detectors 40 and 40a, similarly to the second example.

(4) 4TH EXAMPLE

The above described first and third examples may be combined. Namely, the R/T change mirror 46 is arranged in place of the PBS 43 shown in FIG. 15A. In this case, the reflectivity and transmittance of the S- and P-polarization lights at the R/T mirror 46 are designed complementarily with each other. Namely, when the transmittance $T_S$ of the S-polarization is set to be 20% and the reflectivity $R_S$ of the S-polarization is set to be 80%, for example, the transmittance $T_P$ of the P-polarization is set to be 80% and the reflectivity $R_P$ of the P-polarization is set to be 20%. When applied with the S-polarization light beam B from the rotary optical system 6, the R/T change mirror 46 thus designed reflects 80% of the applied light beam. The reflected beam is incident upon the optical tape 1 via the reflecting mirror 30, ¼-wave plate 44 and the objective lens 2. The reflected light beam from the optical tape 1 returns to the R/T change mirror 46 via the objective lens 2, ¼-wave plate 44 and the reflecting mirror 30. The light beam B is converted from the S-polarization light to the P-polarization light by the function of the ¼-wave plate 44. Namely, when the light beam returns to the R/T change mirror 46, the light beam B has changed to the P-polarization light. Therefore, the R/T change mirror 46 transmits 80% of the light beam B. The transmitted light reach the two-divided detectors 40 and 40a via the PBS, and the tracking error signal is generated using the output signals of the detectors.

(5) 5TH EXAMPLE

In the above described first to fourth examples, the tracking error signal $S_{TEP}$ is produced by calculating the difference of the output signals of the detectors 40 and 40a arranged in the rotary optical system 90. In this configuration, it is necessary to electrically connect the rotating two-divided detectors 40 and 40a with the tracking error signal generation unit 42 provided in the stationary optical system 6. In this view, the fifth example disposes the detectors in the stationary optical system 6, and connects the detectors with the rotary optical system 5 by means of optical fibers.

Figure 15D:
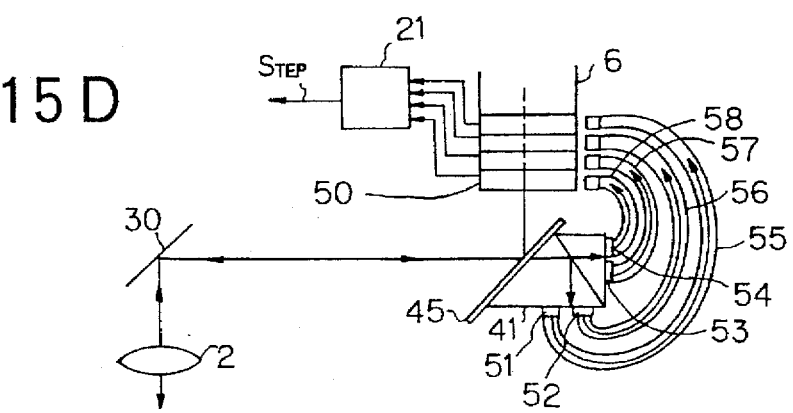

FIG. 15D shows the configuration of the fifth example. As shown, optical fibers 55 to 58 are connected to the light receiving surface of the PBS 41 via the couplers 51 to 54. The other opening ends of the optical fibers 55 to 58 are directed to the four detectors constituting the cylindrical detector 50. The axis of the cylindrical detector 50 coincides with the rotary axis AX of the rotary optical system 6. The reflected light beam from the optical tape 1 is incident upon the half-mirror 45 via the objective lens 2 and the reflecting mirror 30. The reflected light passed through the half-mirror 45 impinges upon the PBS 41 which separates the light. The separated light beams are received by the couplers 51 to 54, respectively, and are incident upon the respective detectors of the cylindrical detector 50 via the optical fibers 50 to 58. Then, the tracking error signal generating unit 21 identical to that of the first embodiment generates the tracking error signal $S_{TEP}$ by calculating the difference of the output signals of the four detectors. It is noted that the fifth example may be applied to the first to fourth examples described above.

According to the first to fifth examples described above, the light receiving elements for receiving the reflected light beam from the optical tape rotates along with the rotary optical system 90, and hence the tracking error signal may be correctly obtained using the push-pull method in the optical pickup for optical tape. Further, according to the fourth example, the design of the optical system of the rotary optical system for obtaining the focus error signal may be simplified. Further, according to the fifth example, the electrical connection of the rotary optical system and the stationary optical system may be facilitated and the structure of the rotary optical system may be simplified, because the two-divided detectors are provided on the stationary optical system side. It is noted that the embodiments and examples described above are directed to the information recording and reproduction on the optical tape according to the magneto-optical recording system. However, the application of the present invention is not limited to these features. Namely, this invention is applicable to other optical recording/reproduction system of additional recording system such as a phase-change recording system and a hole-making recording system. In addition, an optical card may be used as the recording medium. In the above description, a plurality of reflecting mirrors are employed as the light beam guide means. However, optical fibers or prisms may be used to guide the light beam.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical pickup device comprising:

a stationary optical system for emitting a light beam and for producing a tracking error signal; and a rotary optical system rotatable around a rotary axis, said rotary optical system comprising:

a dividing means for dividing the light beam emitted from said stationary optical system into a main beam and sub-beams;

an objective lens for converging the main beam and the sub-beams on a recording surface of an optical recording medium and for receiving the main beam and the sub-beams reflected by the recording surface; and a guiding means for guiding the main beam and the sub-beams to the objective lens and for guiding the main beam and the sub-beams reflected by the recording surface to said stationary optical system, said dividing means, said objective lens and said guiding means being arranged so as to be integrally rotated along with said rotary optical system and said dividing means being arranged on an optical path of the light beam between said stationary optical system and said objective lens.

2. An optical pickup device according to claim 1, wherein said dividing means divides each of the main beam and the sub-beams reflected by the recording surface of the optical recording medium in a direction.

3. An optical pickup device according to claim 2, wherein said stationary optical system comprising a light receiving means for receiving the main beam and the sub-beams reflected by the recording surface of the optical recording medium, said light receiving means comprising at least three light receiving portions aligned in the direction in which said dividing means divides the reflected main beam and the reflected sub-beams.

4. An optical pickup device according to claim 1, wherein said rotary axis is normal to the recording surface of the optical recording medium.

5. An optical pickup device according to claim 1, wherein said rotary axis passes outside of the recording surface of the optical recording medium.

6. An optical pickup device according to claim 1, wherein said stationary optical system comprises a light receiving means for receiving the main beam and the sub-beams reflected by the recording surface of the optical recording medium, said light receiving means comprising a plurality of light receiving portions of a fan-shape having a curvature equal to a curvature of an information track on the optical tape.

7. An optical pickup device for reading out information from an optical recording medium on which information is recorded on tracks repetitively formed in a longitudinal direction thereof, said device comprising:

a stationary optical system for emitting a light beam; and a rotary optical system rotatable around a rotary axis, said rotary optical system comprising:

an objective lens for converging the light beam on a recording surface of the recording medium and for receiving the light beam reflected by the recording surface, said objective lens moving along the tracks of said recording medium so that the light beam converged on the surface traces the tracks;

a dividing means for dividing the light beam reflected by the recording surface into a plurality of light beams;

a guiding means for guiding the light beam from said stationary optical system to the objective lens and for guiding the light beam reflected by the recording surface to said dividing means; and a light receiving means for receiving the light beams divided by said dividing means to produce a tracking error signal, said objective lens, said dividing means, said guiding means and said light receiving means being arranged so as to be integrally rotated along with said rotary optical system.

8. A device according to claim 7, wherein said dividing means is located on said rotary axis of said optical rotary system.

9. A device according to claim 7, wherein said dividing means comprises:

a first dividing means for dividing the light beam reflected by the recording surface into a first light beam propagating to said stationary system and a second light beam; and a second dividing means for dividing the second light beam into a third light beam and a fourth light beam, said light receiving means producing the tracking error signal from the third light beam and the fourth light beam using a push-pull method.

* * * * *